(12) United States Patent
Ahn et al.

(10) Patent No.: US 11,854,536 B2
(45) Date of Patent: Dec. 26, 2023

(54) KEYWORD SPOTTING APPARATUS, METHOD, AND COMPUTER-READABLE RECORDING MEDIUM THEREOF

(71) Applicant: Hyperconnect Inc., Seoul (KR)

(72) Inventors: Sang Il Ahn, Chungcheongbuk-do (KR); Seung Woo Choi, Seoul (KR); Seok Jun Seo, Seoul (KR); Beom Jun Shin, Seoul (KR)

(73) Assignee: Hyperconnect Inc., Seoul (KR)

( * ) Notice: Subject to any disclaimer, the term of this patent is extended or adjusted under 35 U.S.C. 154(b) by 0 days.

(21) Appl. No.: 17/013,391

(22) Filed: Sep. 4, 2020

(65) Prior Publication Data

US 2021/0074270 A1  Mar. 11, 2021
US 2023/0162724 A9  May 25, 2023

(30) Foreign Application Priority Data

Sep. 6, 2019 (KR) .......... 10-2019-0111046
Oct. 18, 2019 (KR) .......... 10-2019-0130044

(51) Int. Cl.
*G10L 15/16* (2006.01)
*G10L 25/24* (2013.01)
*G10L 15/08* (2006.01)

(52) U.S. Cl.
CPC .............. *G10L 15/16* (2013.01); *G10L 25/24* (2013.01); *G10L 2015/088* (2013.01)

(58) Field of Classification Search
CPC .... G10L 15/16; G10L 25/24; G10L 2015/088
See application file for complete search history.

(56) References Cited

U.S. PATENT DOCUMENTS 10,762,894 B2 *  9/2020  Sainath ................... G06N 3/045
11,062,725 B2 *  7/2021  Variani ................. G10L 21/028
(Continued)

FOREIGN PATENT DOCUMENTS

KR  10-2009-0015678 A  2/2009
KR  10-2019-0007934 A  1/2019

OTHER PUBLICATIONS

Choi et al., "Temporal Convolution for Real-time Keyword Spotting on Mobile Devices," arXiv: 1904.03814v1 [cs.SD], 5 pages, Apr. 8, 2019. (Year: 2019).*

(Continued)

*Primary Examiner* — Michelle M Koeth
(74) *Attorney, Agent, or Firm* — KPPB LLP

(57) ABSTRACT

A keyword spotting apparatus, method, and computer-readable recording medium are disclosed. The keyword spotting method using an artificial neural network according to an embodiment of the disclosure may include obtaining an input feature map from an input voice; performing a first convolution operation on the input feature map for each of n different filters having the same channel length as the input feature map, wherein a width of each of the filters is w1 and the width w1 is less than a width of the input feature map; performing a second convolution operation on a result of the first convolution operation for each of different filters having the same channel length as the input feature map; storing a result of the second convolution operation as an output feature map; and extracting a voice keyword by applying the output feature map to a learned machine learning model.

17 Claims, 18 Drawing Sheets

(56) References Cited

U.S. PATENT DOCUMENTS

| | | | |
|---|---|---|---|
| 11,443,134 | B2 | 9/2022 | Ahn et al. |
| 2018/0068675 | A1* | 3/2018 | Variani ................. G10L 19/008 |
| 2018/0204111 | A1 | 7/2018 | Zadeh et al. |
| 2019/0286953 | A1 | 9/2019 | Farhadi et al. |
| 2019/0341052 | A1* | 11/2019 | Allibhai ................. G06N 3/006 |
| 2020/0097818 | A1 | 3/2020 | Li et al. |
| 2020/0210759 | A1 | 7/2020 | Chou et al. |
| 2020/0410318 | A1 | 12/2020 | Del Mundo et al. |
| 2021/0064920 | A1 | 3/2021 | Ahn et al. |
| 2021/0089871 | A1 | 3/2021 | Han et al. |
| 2021/0166106 | A1 | 6/2021 | Ghasemzadeh et al. |
| 2022/0207367 | A1 | 6/2022 | Ahn et al. |
| 2022/0207368 | A1 | 6/2022 | Ahn et al. |

OTHER PUBLICATIONS

Kao et al., "Sub-band Convolutional Neural Networks for Small-footprint Spoken Term Classification," arXiv:1907.01448v1 [eess.AS], Jul. 2, 2019. (Year: 2019).*

Tang et al., "Deep Residual Learning for Small-Footprint Keyword Spotting," 2018 IEEE International Conference on Acoustics, Speech and Signal Processing (ICASSP), 2018, pp. 5484-5488, doi: 10.1109/ICASSP.2018.8462688. (Year: 2018).*

Sainath et al., "Convolutional neural networks for small-footprint keyword spotting," Interspeech 2015, 5 pages. (Year: 2015).*

S. Ganapathy and V. Peddinti, "3-D CNN Models for Far-Field Multi-Channel Speech Recognition," 2018 IEEE International Conference on Acoustics, Speech and Signal Processing (ICASSP), Calgary, AB, Canada, 2018, pp. 5499-5503, doi: 10.1109/ICASSP.2018.8461580. (Year: 2018).*

Office Action issued in Korean Patent Application No. 10-2019-0130044, dated Aug. 18, 2020.

Amended Claims for European Patent Application No. 20193178.9, Filed After Receipt of European Search Report, dated Sep. 16, 2021.

Amendment Including Specification for Korean Patent Application No. 10-2019-0106638, Jun. 28, 2021.

Extended European Search Report for European Patent Application No. 20193178.9, dated Feb. 12, 2021, 12 Pgs.

Office Action for Korean Patent Application No. 10-2019-0106638, dated Feb. 26, 2021, 10 Pgs.

"Embedding Normalization: Significance Preserving Feature Normalization for Click-Through Rate Prediction", CIKM'21, Nov. 1-5, 2021, Online, 10 pages.

"Tensorflow Profiler", Obtained from https://github.com/tensorflow/profiler/blob/master/README.md on Apr. 27, 2022, Last comment Nov. 7, 2020, 3 pages.

"TFLite Model Benchmark Tool.", Obtained from https://github.com/tensorflow/tensorflow/tree/r1.13/tensorflow/lite/tools/benchmark/ on Jun. 2, 2022, Last comment Jan. 16, 2019.

Abadi et al., "TensorFlow: a System for Large-scale Machine Learning", Proceedings of the12th USENIX Symposium on Operating Systems Design and Implementation (OSDI '16), Nov. 2-4, 2016, pp. 265-283.

Andrade et al., "A Neural Attention Model for Speech Command Recognition", arXiv preprint arXiv:1808.08929, Published online Aug. 27, 2018, 18 pages.

Arik et al., "Convolutional Recurrent Neural Networks for Small-Footprint Keyword Spotting", Proceedings of the Annual Conference of the International Speech Communication Association (INTERSPEECH), Published online 2017, 5 pages.

Arik et al., "Fast Spectrogram Inversion Using Multi-head Convolutional Neural Networks", arXiv preprint arXiv:1808.06719, Published online Nov. 6, 2018, 6 pages.

Chen et al., "Small-Footprint Keyword Spotting Using Deep Neural Networks", Proceedings of the IEEE International Conference on Acoustics, Speech and Signal Processing (ICASSP), https://doi.org/10.1109/ICASSP.2014.6854370, Published online 2014, 5 pages.

Choi et al., "Convolutional Recurrent Neural Networks for Music Classification", Proceedings of the IEEE International Conference on Acoustics, Speech and Signal Processing (ICASSP), Published online Dec. 21, 2016, 5 pages.

Cowan et al., "Automating Generation of Low Precision Deep Learning Operators", arXiv: 1810.11066v1, Oct. 25, 2018, pp. 1-10.

He et al., "Deep Residual Learning for Image Recognition", Proceedings of the IEEE/CVF Conference on Computer Vision and Pattern Recognition (CVPR), Published online Dec. 10, 2015, 12 pages.

Howard et al., "MobileNets: Efficient Convolutional Neural Networks for Mobile Vision Applications", arXiv preprint arXiv:1704.04861, Published online Apr. 17, 2017, 9 pages.

Ioffe et al., "Batch Normalization: Accelerating Deep Network Training by Reducing Internal Covariate Shift", Proceedings of the Internal Conference on Machine Learning (ICML), Published online Mar. 2, 2015, 11 pages.

Liang et al., "FP-BNN: Binarized Neural Network on FPGA", Neurocomputing, vol. 275, pp. 1072-1086, Published Oct. 18, 2017, 15 pages.

Lim et al., "Rare Sound Event Detection Using 1D Convolutional Recurrent Neural Networks", Proceedings of the Detection and Classification of Acoustic Scenes and Events 2017 Workshop, Published online Nov. 16, 2017, 5 pages.

Ma et al., "Shufflenet V2: Practical Guidelines for Efficient CNN Architecture Design", Proceedings of the European Conference on Computer Vision (ECCV), Published online 2018, 19 pages.

Mittal, "A Survey of FPGA-based Accelerators for Convolutional Neural Networks", Neural Computing and Applications 2020, vol. 32, No. 4, https://doi.org/10.1007/s00521-018-3761-1, pp. 1109-1139, Published Online Oct. 6, 2018.

Prechlet, "Early Stopping—but When?", Neural Networks: Tricks of the trade, Springer, pp. 55-69, Published online 1998.

Sandler et al., "Mobilenetv2: Inverted Residuals and Linear Bottlenecks", Proceedings of the IEEE/CVF Conference on Computer Vision and Pattern Recognition (CVPR), Published online 2018, 11 pages.

Sigtia et al., "Efficient Voice Trigger Detection for Low Resource Hardware", Proceedings of the Annual Conference of the International Speech Communication Association (INTERSPEECH), https://www.iscaspeech.org/archive/Interspeech_2018/abstracts/2204.html, Published online 2018, 5 pages.

Simons et al., "A Review of Binarized Neural Networks", Electronics, vol. 8, No. 661, pp. 1-25, Published Jun. 12, 2019.

Sun et al., "Compressed Time Delay Neural Network for Small-footprint Keyword Spotting", Proceedings of the Annual Conference of the International Speech Communication Association (INTERSPEECH), Published Online 2017, 5 pages.

Tan et al., "Mnas-net: Platform-aware Neural Architecture Search for Mobile", arXiv preprint arXiv: 1807.11626, Published online May 29, 2019, 9 pages.

Tucker et al., "Model Compression Applied to Small-footprint Keyword Spotting", Proceedings of the Annual Conference of the International Speech Communication Association (INTERSPEECH), Published Online 2016, 5 pages.

Umuroglu et al., "Work-in-Progress: Towards Efficient Quantized Neural Network Inference on Mobile Devices", 2017 International Conference on Compilers, Architectures and Synthesis for Embedded Systems, 2 Pgs, Oct. 15, 2017.

Wang et al., "Small-footprint Keyword Spotting Using Deep Neural Network and Connectionist Temporal Classifier", arXiv preprint arXiv:1709.03665, Published online Sep. 12, 2017, 6 pages.

Warden, "Launching the Speech Commands Dataset.[online]", https://ai.googleblog.com/2017/08/launching-speech-commands-dataset.html, Published online Aug. 2017, 2 pages.

Zhang et al., "Hello Edge: Keyword Spotting on Microcontrollers", arXiv preprint arXiv:1711.07128, Published online Feb. 14, 2018, 14 pages.

Extended European Search Report for European Patent Application No. 21217866.9, Search completed May 23, 2022, dated Jun. 1, 2022, 10 pages.

(56) References Cited

OTHER PUBLICATIONS

Huang et al., "Normalization Techniques in Training DNNs: Methodology, Analysis and Application", arXiv:2009.12836, Sep. 27, 2020, 20 pages.

Wang et al., "Correct Normalization Matters: Understanding the Effect of Normalization on Deep Neural Network Models for Click-Through Rate Prediction", Proceedings of 2020 Association for Computing Machinery, arXiv:2006.12753v2 [cs.LG] Jul. 7, 2020, 8 pgs., https://doi.org/10.1145/1122445.1122456.

Yi et al., "Embedding Normalization: Significance Preserving Feature Normalization for Click-Through Rate Prediction", 2021 International Conference on Data Mining Workshops (ICDMW), IEEE, Dec. 7, 2021, pp. 75-84, DOI 10.1109/ICDMW53433.2021.00016.

Zheng et al., "CowClip: Reducing CTR Prediction Model Training Time from 12 hours to 10 minutes on 1 GPU", arXiv:2204.06240v2, Apr. 22, 2022, 21 pages.

\* cited by examiner

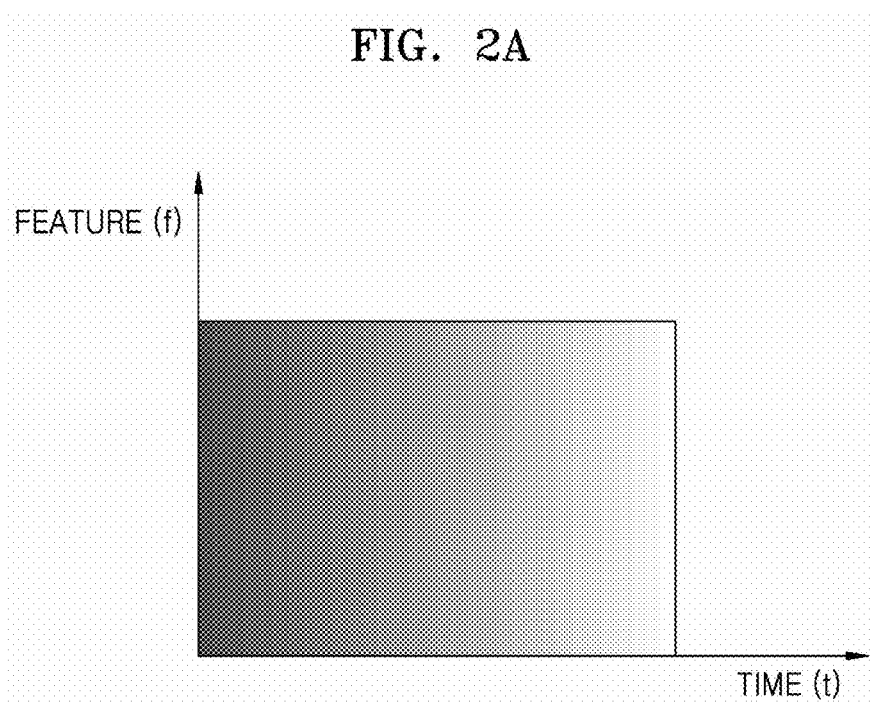

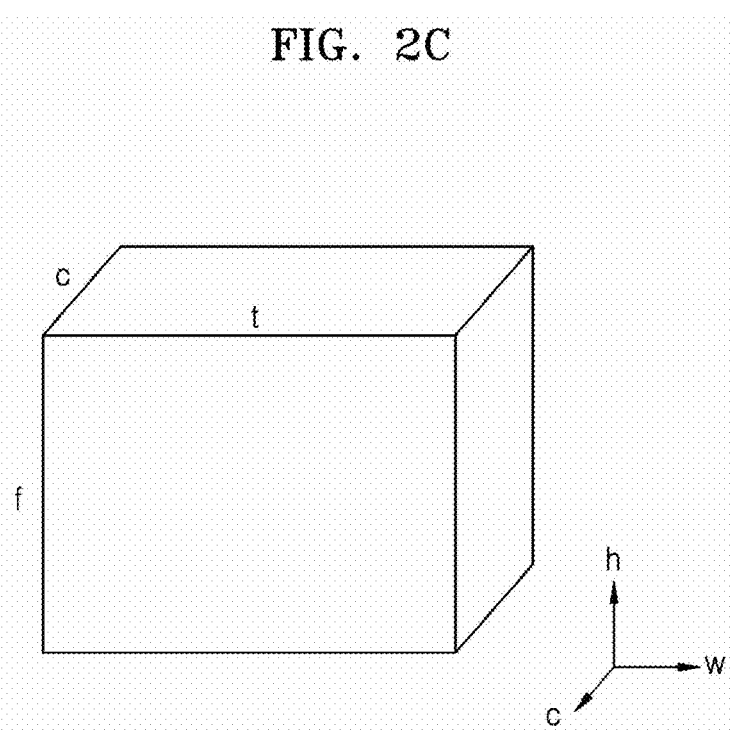

FIG. 12

| Model | Acc (%) | Time (ms) | FLOPs | Params |
|---|---|---|---|---|
| CNN-1 | 90.7 | 32 | 76.1M | 524K |
| CNN-2 | 84.6 | 1.2 | 1.5M | 148K |
| DS-CNN-S | 94.4 | 1.6 | 5.4M | 24K |
| DS-CNN-M | 94.9 | 5.2 | 19.8M | 140K |
| DS-CNN-L | 95.4 | 16.8 | 56.9M | 420K |
| Res8-Narrow | 90.1 | 47 | 143.2M | 20K |
| Res8 | 94.1 | 174 | 795.3M | 111K |
| Res15-Narrow | 94.0 | 107 | 348.7M | 43K |
| Res15 | 95.8 | 424 | 1950.0M | 239K |
| TC-ResNet8 | 96.1 | 1.1 | 3.0M | 66K |
| TC-ResNet8-1.5 | 96.2 | 2.8 | 6.6M | 145K |
| TC-ResNet14 | 96.2 | 2.5 | 6.1M | 137K |
| TC-ResNet14-1.5 | 96.6 | 5.7 | 13.4M | 305K |

FIG. 15

| Model | Acc. (%) | Time (ms) | FLOPs | Params |
|---|---|---|---|---|
| 2D-ResNet8 | 96.1 | 10.1 | 35.8M | 66K |
| 2D-ResNet8-Pool | 94.9 | 3.5 | 4.0M | 66K |

KEYWORD SPOTTING APPARATUS, METHOD, AND COMPUTER-READABLE RECORDING MEDIUM THEREOF

CROSS-REFERENCE TO RELATED APPLICATION

This application claims the benefit of Korean Patent Application No. 10-2019-0111046, filed on Sep. 6, 2019, in the Korean Intellectual Property Office and Korean Patent Application No. 10-2019-0130044, filed on Oct. 18, 2019, in the Korean Intellectual Property Office, the disclosures of which are incorporated herein in their entireties by reference.

BACKGROUND

1. Field

The present disclosure relates to a keyword spotting apparatus, a method, and a computer-readable recording medium, and more specifically, to a keyword spotting apparatus, a method, and a computer-readable recording medium capable of spotting keywords very quickly while maintaining high accuracy.

2. Description of Related Art

Keyword Spotting (KWS) plays a very important role in speech-based user interaction in smart devices. Recent technological advances in the field of deep learning are leading the application of CNN to the field of KWS because of the accuracy and robustness of the Convolution Neural Network (CNN).

The most important task facing keyword spotting systems is to resolve the trade-off between high accuracy and low latency. This has become a very important issue since it was known that a traditional convolution-based keyword spotting approach requires a very large amount of computations to get the right level of performance.

Nevertheless, research on the actual latency of keyword spotting models in mobile devices is not active.

SUMMARY

An object of the present disclosure is to provide a keyword spotting apparatus, a method, and a computer-readable recording medium capable of rapidly extracting voice keywords with high accuracy.

Additional aspects will be set forth in part in the description which follows and, in part, will be apparent from the description, or may be learned by practice of the presented embodiments of the disclosure.

A keyword spotting method according to an embodiment of the disclosure may include, in a keyword spotting method using an artificial neural network, may include obtaining an input feature map from an input voice; performing a first convolution operation on the input feature map for each of n different filters having the same channel length as the input feature map, wherein a width of each of the filters is w1 and the width of w1 is less than a width of the input feature map; performing a second convolution operation on a result of the first convolution operation for each of different filters having the same channel length as the input feature map; storing the result of the convolution operation as an output feature map; and extracting a voice keyword by applying the output feature map to a learned machine learning model.

In addition, a stride value of the first convolution operation may be 1.

In addition, the performing of a second convolution operation may include performing a first sub-convolution operation on m different filters having a width of w2 and a result of the first convolution operation; performing a second sub-convolution operation on m different filters having a width of w2 and a result of the first sub-convolution operation; performing a third sub-convolution operation on m different filters having a width of 1 and a result of the first convolution operation; and summing results of the second and third sub-convolution operations.

In addition, stride values of the first to third sub-convolution operations may be 2, 1, and 2, respectively.

In addition, the keyword spotting method according to the disclosure may further include performing a third convolution operation, wherein the performing of the third convolution operation may include performing a fourth sub-convolution operation on I different filters having a width of w2 and the result of the second convolution operation; performing a fifth sub-convolution operation on I different filters having a width of w2 and a result of the fourth sub-convolution operation; performing a sixth sub-convolution operation on I different filters having a width of 1 and the result of the second convolution operation; and summing results of the fifth and sixth sub-convolution operations.

In addition, the keyword spotting method according to the disclosure may further include performing a fourth convolution operation, wherein the performing of the fourth convolution operation may include performing a seventh sub-convolution operation on m different filters having a width of w2 and the result of the second convolution operation; performing an eighth sub-convolution operation on m different filters having a width of w2 and a result of the seventh sub-convolution operation; and summing the result of the second convolution operation and a result of the eighth sub-convolution operation.

In addition, stride values of the seventh and eighth sub-convolution operations may be 1.

In addition, the obtaining of the input feature map includes obtaining an input feature map having a size of $t \times 1 \times f$ (width$\times$height$\times$channel) from a result of mel frequency cepstral coefficient (MFCC) processing for the input voice, where t denotes time and f denotes frequency.

Meanwhile, a computer-readable recording medium on which a program for performing the keyword spotting method according to the disclosure is recorded may be provided.

Meanwhile, a keyword spotting apparatus according to an embodiment of the disclosure, in an apparatus for extracting a voice keyword using an artificial neural network, may include a memory in which at least one program is stored; and a processor for extracting a voice keyword using the artificial neural network by executing the at least one program, wherein the processor may obtain an input feature map from an input voice, perform a first convolution operation on the input feature map for each of n different filters having the same channel length as the input feature map, wherein a width of each of the filters is w1 and the width w1 is less than a width of the input feature map, perform a second convolution operation on a result of the first convolution operation for each of different filters having the same channel length as the input feature map, store the result of the convolution operation as an output feature map, and extract a voice keyword by applying the output feature map to a learned machine learning model.

In addition, a stride value of the first convolution operation may be 1.

In addition, the performing of the second convolution operation by the processor may include performing a first sub-convolution operation on m different filters having a width of w2 and a result of the first convolution operation, performing a second sub-convolution operation on m different filters having a width of w2 and a result of the first sub-convolution operation, performing a third sub-convolution operation on m different filters having a width of 1 and a result of the first convolution operation, and summing results of the second and third sub-convolution operations.

In addition, stride values of the first to third sub-convolution operations may be 2, 1, and 2, respectively.

In addition, the processor may further perform a third convolution operation, wherein the performing of the third convolution operation may include performing a fourth sub-convolution operation on l different filters having a width of w2 and the result of the second convolution operation, performing a fifth sub-convolution operation on l different filters having a width of w2 and a result of the fourth sub-convolution operation, performing a sixth sub-convolution operation on l different filters having a width of 1 and the result of the second convolution operation; and summing results of the fifth and sixth sub-convolution operations.

In addition, the processor may further perform a fourth convolution operation, wherein the performing of the fourth convolution operation may include performing a seventh sub-convolution operation on m different filters having a width of w2 and the result of the second convolution operation, performing an eighth sub-convolution operation on m different filters having a width of w2 and a result of the seventh sub-convolution operation, and summing the result of the second convolution operation and a result of the eighth sub-convolution operation.

In addition, stride values of the seventh and eighth sub-convolution operations may be 1.

In addition, the processor obtains an input feature map having a size of t×1×f (width×height×channel) from a result of mel frequency cepstral coefficient (MFCC) processing for the input voice, where t denotes time and f denotes frequency.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 2A to 2C are diagrams schematically illustrating a convolution operation method according to the related art.

FIG. 12 is a performance comparison table for illustrating an effect of a keyword spotting method according to the disclosure.

FIG. 15 is a performance comparison table for illustrating an effect of a keyword spotting method according to another embodiment of the disclosure.

DETAILED DESCRIPTION

Figure 1:
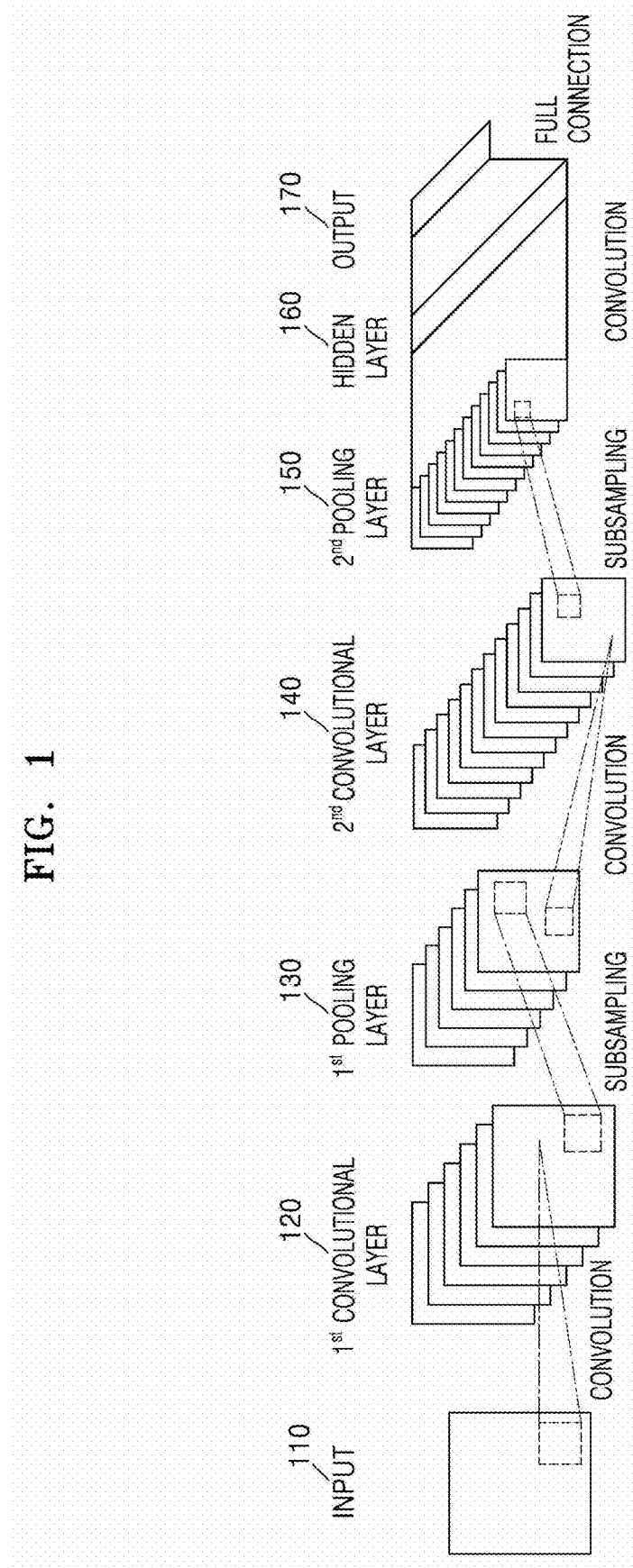
FIG. 1 is a schematic diagram illustrating a convolutional neural network according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Advantages and features of the present invention, and a method of achieving them will become apparent with reference to embodiments described below in detail together with an accompanying drawings. However, the present invention is not limited to the embodiments disclosed below, but will be implemented in various different forms. These embodiments are provided only to make the disclosure of the present invention complete, and to fully inform the scope of the invention to those of ordinary skill in the art to which the present invention belongs. The invention is only defined by the scope of the claims. The same reference numerals refer to the same elements throughout the specification.

Although "first" or "second" is used to describe various elements, these elements are not limited by the terms as described above. The terms as described above may be used only to distinguish one element from another element. Therefore, the first element mentioned below may be a second element within the technical idea of the present invention.

The terms used in the present specification are for explaining embodiments and are not intended to limit the present invention. In this specification, the singular form also includes the plural form unless otherwise specified in the phrase. As used in the specification, "comprises" or "comprising" is implied that the recited element or step does not exclude the presence or addition of one or more other elements or steps.

Unless otherwise defined, all terms used in the present specification may be interpreted as meanings that may be commonly understood by those of ordinary skill in the art to which the present invention belongs. In addition, terms defined in a commonly used dictionary are not interpreted ideally or excessively unless explicitly defined specifically.

FIG. 1 is a schematic diagram illustrating a convolutional neural network according to an embodiment.

A convolutional neural network (CNN) is a kind of artificial neural network (ANN), and may be mainly used to extract features of matrix data or image data. The CNN may be an algorithm that learns features from history data.

In the CNN, a processor may obtain a feature by applying a filter to an input image 110 through a first convolutional layer 120. A processor may reduce a size by sub-sampling the filtered image through a first pooling layer 130. The processor may filter the image through a second convolution layer 140 and a second pooling layer 150 to extract features, and may reduce the size by sub-sampling the filtered image. Thereafter, the processor may obtain output data 170 by fully connecting the processed image through a hidden layer 160.

In the CNN, the convolutional layers 120 and 140 perform a convolution operation between input activation data, which is 3D input data, and weight data, which is 4D data representing a learnable parameter, to obtain output activation data, which is 3D output data. Here, the obtained output activation data may be used as input activation data in a next layer.

On the other hand, because thousands of multiplication and addition operations are required to calculate one pixel on the output activation data, which is the 3D output data, most of the data processing time in the CNN is spent in the convolutional layer.

Figure 2B:
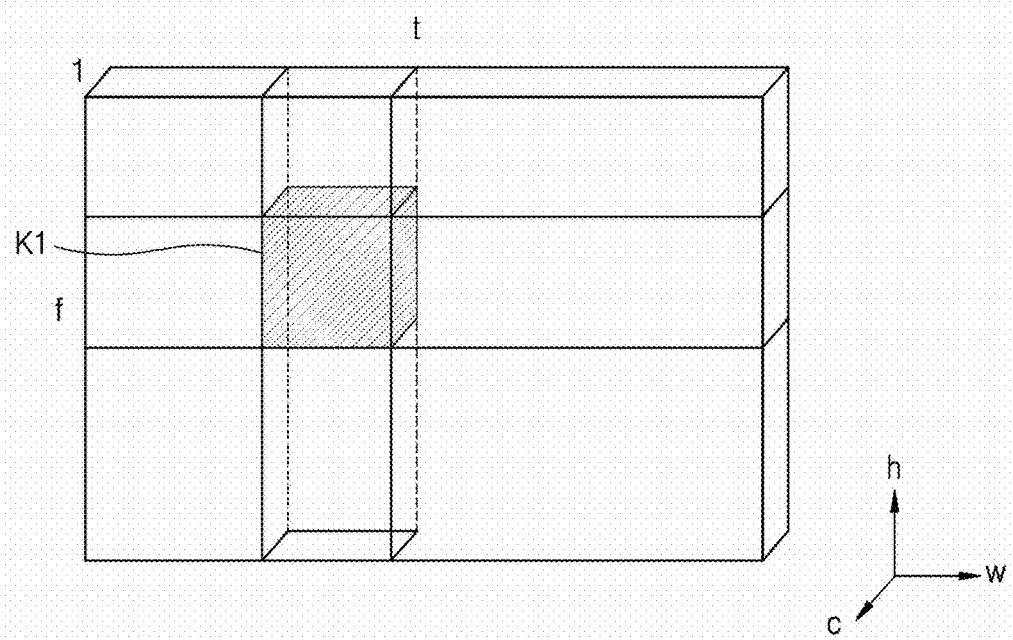

FIGS. 2A to 2C are diagrams schematically illustrating a convolution operation method according to the related art.

First, FIG. 2A exemplarily shows an input voice to be subjected to voice keyword extraction. In the input voice, the horizontal axis represents time and the vertical axis represents a feature. Considering that the input voice is a voice signal, the feature may be understood to mean a frequency. Although FIG. 2A illustrates features or frequencies having a constant magnitude over time for convenience of explanation, it should be understood that voice has a characteristic that frequency changes with time. Accordingly, in general, it may be understood that the voice signal is a signal having varying frequency with respect to the time axis.

The graph shown in FIG. 2A may be a result of Mel Frequency Cepstral Coefficient (MFCC) processing for the input voice. MFCC is one of the techniques for extracting features of sound, and is a technique for extracting features through spectrum analysis for each section by dividing an input sound by a predetermined period (short time). In addition, the input data I represented by the graph may be expressed as follows.

$I \in R^{t \times f}$

FIG. 2B illustrates an input feature map and a convolution filter K1 generated from the input voice shown in FIG. 2A. The input feature map may be generated from MFCC data illustrated in FIG. 2A, and as shown in FIG. 2B, may be generated with a size of t×f×1 for a width (w)×height (h)×channel (c) direction. In addition, the input data $X_{2d}$ corresponding to the input feature map may be expressed as follows.

$X_{2d} \in R^{t \times f \times 1}$

Because a length of the input feature map in the channel direction is 1, it may be understood as 2D data of size t×f. The filter K1 may perform a convolution operation while moving in a width direction and a height direction in the t×f plane of the input feature map. Here, assuming that a size of the filter K1 is 3×3, the weight data $W_{2d}$ corresponding to the filter K1 may be expressed as follows.

$W_{2d} \in R^{3 \times 3 \times 1}$

When a convolution operation is performed on the input data $X_2d$ and the weight data W2d, the number of operations may be expressed as 3×3×1×f×t. In addition, assuming that the number of filters K1 is c, the number of operations may be expressed as 3×3×1×f×t×c.

FIG. 2C exemplarily shows an output feature map obtained as a result of a convolution operation performed on the input data $X_{2d}$ and the weight data $W_{2d}$. As described above, because the number of filters K1 is assumed to be c, it may be seen that the length of the output feature map in the channel direction is c. Accordingly, data corresponding to the output feature map may be expressed as follows.

$Y_{2d} \in R^{t \times f \times c}$

The CNN is known as a neural network that performs continuous conversion from a low-level to a high-level. On the other hand, in the modern CNN, because a filter of a small size is used, it may be difficult to extract useful features from both low-frequency and high-frequency in a relatively shallow network.

When image analysis is performed through a CNN, adjacent pixels among a plurality of pixels constituting an image have a high probability of having similar characteristics, and pixels located farther away have a relatively high probability of having different characteristics. Therefore, CNNs may be a good tool for image analysis and learning.

On the other hand, when a conventional CNN used for image analysis and learning is applied to speech analysis and learning, efficiency may be degraded. The size of the frequency of the voice signal changes with time, because even if the voice signal is temporally adjacent, the difference in frequency may be large.

Figure 3A:
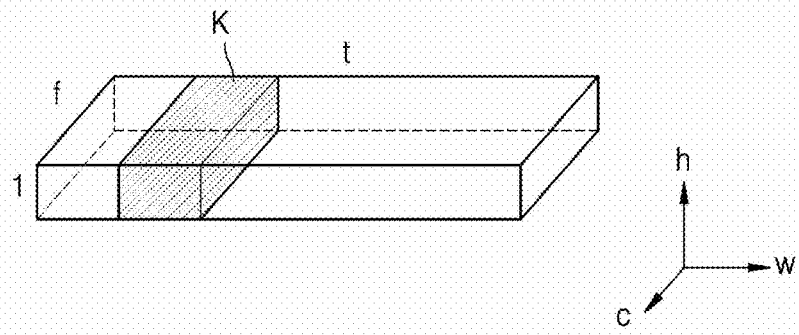
FIGS. 3A and 3B are diagrams schematically illustrating a convolution operation method according to an embodiment of the disclosure.
Figure 3B:
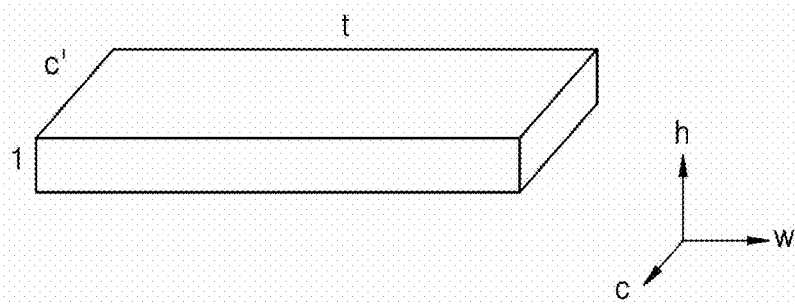

FIGS. 3A and 3B are diagrams schematically illustrating a convolution operation method according to an embodiment of the disclosure.

FIG. 3A illustrates an input feature map and a filter K according to an embodiment of the disclosure. The input feature map shown in FIG. 3A has substantially the same size as the input feature map of FIG. 2B, but has a height of 1, and a length in a channel direction may be defined as f. The length in the channel direction of the filter K according to the disclosure is the same as the length in the channel direction of the input feature map. Therefore, it is possible to cover all frequency data included in the input feature map with only one filter K.

Input data $X_{1d}$ and weight data $W_{1d}$ respectively corresponding to the input feature map and filter K of FIG. 3A may be expressed as follows.

$X_{1d} \in R^{t \times 1 \times f}$ $W_{1d} \in R^{3 \times f \times 1}$

Because the input feature map and the filter K have the same length in the channel direction, the filter K needs to perform a convolution operation while moving only in the width w direction. Therefore, unlike the data described with reference to FIGS. 2A to 2C, the convolution operation according to the disclosure may be understood as a one-dimensional operation.

When the form of the input feature map is the same as the input feature map of FIG. 2B, the length of the filter K in the channel direction may be defined as 1 and the height may be defined as f. Therefore, the filter K according to the disclosure is not limited to the length in the channel direction. Because the height of the input feature map or the length in the channel direction may be 1, the filter K according to the disclosure is characterized in that the length in the direction other than the length in the width direction matches the length in the direction corresponding to the input feature map.

When a convolution operation is performed on the input data $X_{1d}$ and the weight data $W_{1d}$, the number of operations may be expressed as 3×1×f×t×1. In addition, assuming that the number of filters K is c', the number of operations may be expressed as 3×1×f×t×1×c'.

FIG. 3B exemplarily illustrates an output feature map obtained as a result of a convolution operation performed on the input data $X_{1d}$ and the weight data $W_{1d}$. As described above, because the number of filters K is assumed to be c', it may be seen that the length of the output feature map in the channel direction is c'. Accordingly, data corresponding to the output feature map may be expressed as follows.

$$Y_{1d} \in R^{t' \times 1 \times c'}$$

Comparing the size of the filter K1 used in the related art with the size of the filter K according to the disclosure, the filter K according to the disclosure is larger in size and enables to perform convolution operation on more data per filter. Accordingly, the convolution operation according to the disclosure may perform the convolution operation with only a smaller number of filters compared to the related art.

That is, because a relationship c>c' is established, the total number of convolution operations is further reduced by the convolution operation method according to the disclosure.

Figure 4:
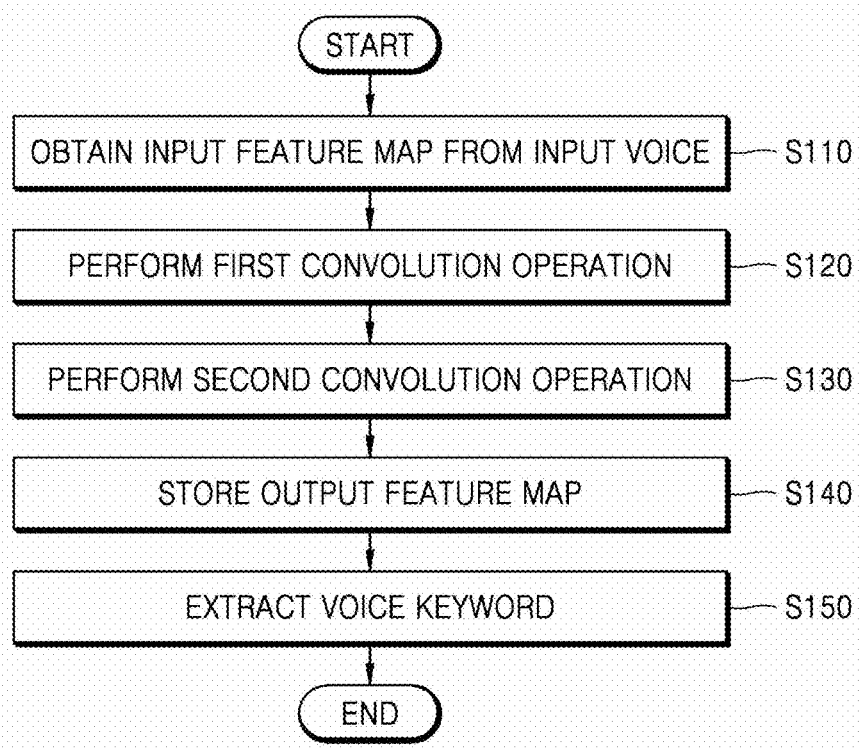
FIG. 4 is a flowchart schematically illustrating a keyword spotting method according to an embodiment of the disclosure.

FIG. 4 is a flowchart schematically illustrating a keyword spotting method according to an embodiment of the disclosure.

Referring to FIG. 4, the keyword spotting method according to an embodiment of the disclosure may include obtaining an input feature map from an input voice (S110), performing a first convolution operation (S120), performing a second convolution operation (S130), storing an output feature map (S140), and extracting a voice keyword (S150).

The keyword spotting method according to the disclosure is a keyword spotting method using an ANN. In step S110, the input feature map is obtained from an input voice. Voice keyword extraction aims to extract predefined keywords from an audio signal stream. For example, the keyword spotting method may also be used when a keyword such as "Hey Siri" or "Okay Google" is identified from a human voice and used as a wake-up language of a device.

In step S110, the input feature map having a size of t×1×f (width×height×channel) may be obtained from a result of MFCC processing on the input voice. Here, t is time and f is frequency.

The input feature map may express the input voice acquired for a predetermined time (t) as a frequency with respect to time (t). In addition, each frequency data in the input feature map may be expressed as a floating point.

In step S120, a first convolution operation is performed on the input feature map for each of n different filters having the same channel length as the input feature map. Each of the n different filters may discriminate different voices. For example, a first filter may determine a voice corresponding to 'a', and a second filter may determine a voice corresponding to 'o'. Voices corresponding to the characteristics of each filter through the n different filters and convolution operations may further enhance the features of a sound.

A width of the n filters may be defined as w1. When a width of the input feature map is w, the relationship w>w1 may be established. For example, in FIG. 3A, the width of the input feature map may be t and the width of the filter K1 may be 3. When the number of filters is n in the first convolution operation, a total of n outputs are generated. The convolution operation may be performed through a processor such as a CPU, and the result of the convolution operation may be stored in a memory or the like.

In the first convolution operation performed through step S120, a stride value of '1' may be applied. The stride refers to an interval at which the filter skips input data in the convolution operation. When '1' is applied as a stride value, the convolution operation is performed on all input data without skipping data.

In step S130, a second convolution operation is performed on a result of the first convolution operation for each of different filters having the same channel length as the input feature map. The number of filters used for the second convolution operation may be m, and the width of the filter may be defined as w2. In this case, the width of the filter used for the second convolution operation and the width of the filter used for the first convolution operation may be the same as or different from each other.

However, the length in the channel direction of the filter used in the second convolution operation is the same as the length in the channel direction of the input feature map, similar to the length in the channel direction of the filter used in the first convolution operation.

The m different filters used in the second convolution operation may discriminate different voices, similar to n different filters used in the first convolution operation.

In step S140, a result of the previous convolution operation is stored as an output feature map. The output feature map is a result finally obtained before extracting the voice keyword in step S150, and may have a form as shown in FIG. 3B.

The output feature map stored in step S140 may be understood as a result of the convolution operation performed in the preceding step. Accordingly, in step S140, the result of the second convolution operation performed in step S130 may be stored as the output feature map.

In step S150, a voice keyword is extracted by applying the output feature map to a trained machine learning model. The machine learning model may include a pooling layer, a full-connect layer, a softmax operation, and the like, which will be described in detail with reference to the following drawings.

A pooling operation may be performed following the convolution operation described herein, and a zero padding technique may be applied to prevent data reduction that may occur during the pooling operation.

Figure 5:
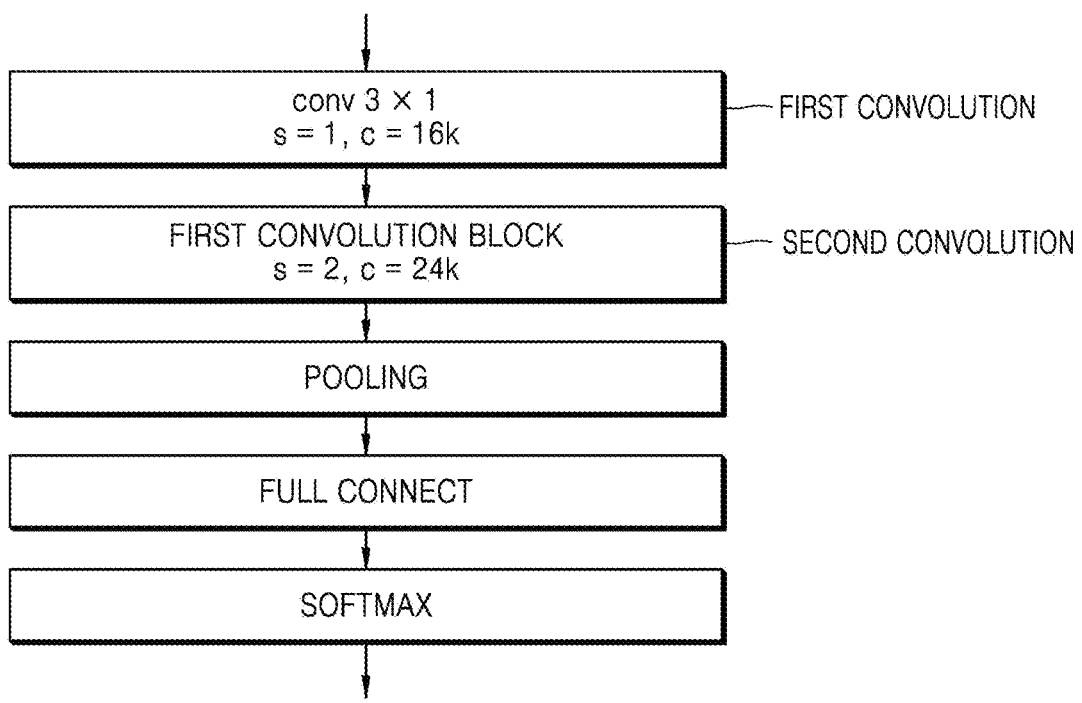
FIG. 5 is a flowchart schematically illustrating a convolution operation process according to an embodiment of the disclosure.

FIG. 5 is a flowchart schematically illustrating a convolution operation process according to an embodiment of the disclosure.

Referring to FIG. 5, performing a first convolution operation (S120) and performing a second convolution operation (S130) are shown in more detail. In the step in which the first convolution operation is performed, a convolution operation is performed between the input feature map and the filter. In the embodiment shown in FIG. 5, the filter has a size of 3×1, which means a filter having a width of 3 and a height of 1. In addition, as described with reference to FIG. 4, the length of the filter in the channel direction is the same as the length of the input feature map in the channel direction.

Meanwhile, 1 is applied to the stride value of the first convolution operation, and the number of filters may be 16 k. Here, k is a multiplier for the number of channels, and when k is 1, it may be understood that a convolution operation is performed between the input feature map and a total of 16 different filters. That is, when the value of k is 1, the value of n is 16.

In the step of performing the second convolution operation, a convolution operation may be performed between the result of the first convolution operation and the first convolution block. For the second convolution operation, filters having different widths from the filter used in the step in which the first convolution operation is performed may be used. Also, in the embodiment shown in FIG. 5, 2 may be applied as a value of the stride of the second convolution operation. In addition, 16 k different filters may be used in the first convolution operation, but 24 k different filters may be used in the second convolution operation. Therefore, it may be understood that the number of filters used in the second convolution operation is 1.5 times larger than the number of filters used in the first convolution operation. That is, when the value of k is 1, the value of m is 24.

When the second convolution operation is performed, a final result may be extracted after performing a pooling layer, a fully connected layer, and a softmax operation.

One model including the first and the second convolution operations, pooling, fully connected, and softmax of FIG. 5 may be understood as an ANN model according to an embodiment of the disclosure.

Figure 6:
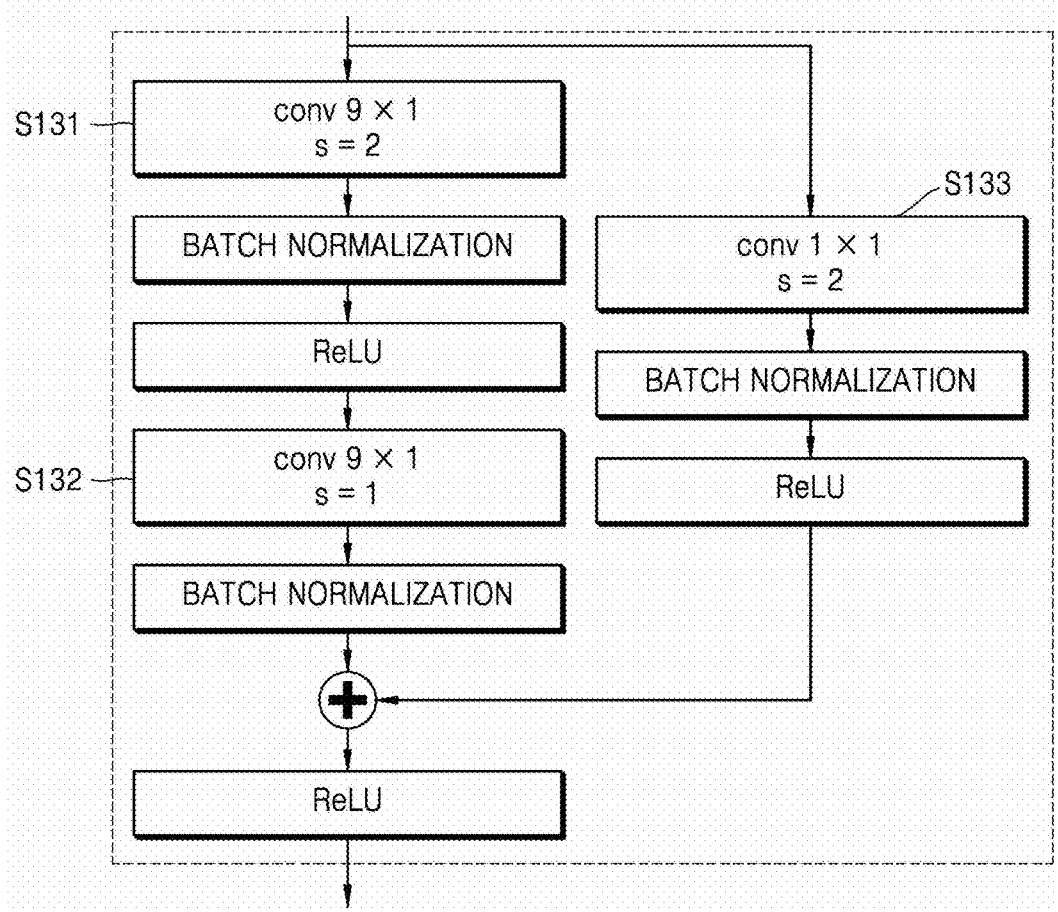
FIG. 6 is a block diagram schematically illustrating a configuration of a first convolution block according to an embodiment of the disclosure.

FIG. 6 is a block diagram schematically illustrating a configuration of a first convolution block according to an embodiment of the disclosure.

The first convolution block is a convolution block used in the second convolution operation described with reference to FIGS. 4 and 5. The second convolution operation step S130 using the first convolution block includes performing a first sub-convolution operation on a result of the first convolution operation and m different filters having a width of w2 (S131). In this case, the width of the filter used may be different from the width of the filter used for the first convolution operation or the second convolution operation. In the exemplary embodiment illustrated in FIG. 6, the width of the filter used in step S131, that is, a value of w2, may be 9. In addition, as described with reference to FIG. 5, the number of filters used in step S131 is 16 k, and a total of 16 k convolution operations may be performed. Meanwhile, in step S131, 2 may be applied as the stride value.

When step S131 is performed, batch normalization and activation function may be applied to the convolution result. In FIG. 6, an embodiment using a rectified linear unit (ReLU) as the activation function is disclosed. The batch normalization may be applied to solve a gradient vanishing or gradient exploding problem that may occur as a convolution operation is repeatedly performed. Activation function may also be applied to solve the gradient vanishing or gradient exploding problem, and may be a means to solve an over fitting problem. There may be various types of functions in the activation function, and the disclosure discloses a method of applying the ReLU function as an embodiment. When convolutional data is normalized through the batch normalization process, the ReLU function may be applied to the normalized data.

The batch normalization and activation function are used to solve gradient vanishing (or exploding) and over fitting that may occur while going through several stages of convolutional layers. When there are other means for solving this problem, the embodiments of the disclosure may be variously changed.

When the batch normalization and application of the activation function are completed, a second sub-convolution operation may be performed (S132). In step S132, a second sub-convolution operation is performed on m different filters having a width w2 and a result of the first sub-convolution operation. In this case, the width of the filter used may be different from the width of the filter used for the first convolution operation or the second convolution operation. In the embodiment illustrated in FIG. 6, the width of the filter used in step S132 may be 9. In addition, as described with reference to FIG. 5, the number of filters used in step S132 is 16 k, and a total of 16 k convolution operations may be performed. Meanwhile, in step S132, 1 may be applied as the stride value. In addition, when the second sub-convolution operation is performed in step S132, batch normalization may be performed.

In step S133, a third sub-convolution operation may be performed. In the third sub-convolution operation, a convolution operation is performed on m different filters having a width of 1 and the result of the convolution operation performed in step S120. In addition, in this case, 2 may be applied as the stride value. When the third sub-convolution operation is performed in step S133, then batch normalization and activation function may be applied.

Meanwhile, step S130 may further include summing the result of the second sub-convolution operation performed in step S132 and the result of the third sub-convolution operation performed in step S133. As shown in FIG. 6, when the results of the second and third sub-convolution operations are summed, and an activation function is finally applied to the summation result, data may be transferred to a next step, for example, a pooling layer.

Figure 7:
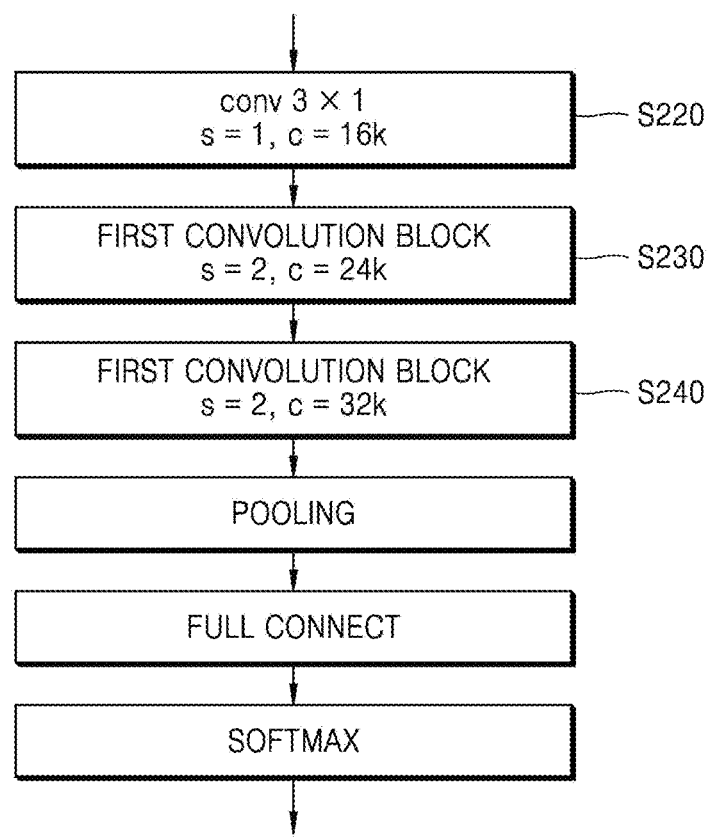
FIG. 7 is a flowchart schematically illustrating a keyword spotting method according to another embodiment of the disclosure.

FIG. 7 is a flowchart schematically illustrating a keyword spotting method according to another embodiment of the disclosure.

Referring to FIG. 7, a keyword spotting method according to another embodiment of the disclosure includes performing a first convolution operation (S220), performing a second convolution operation (S230), and performing a third convolution operation (S240). In step S220 and step S230, the first convolution operation and the second convolution operation described with reference to FIGS. 4 to 6 may be performed.

In step S240, the third sub-convolution operation may be performed using a first convolution block including the configuration shown in FIG. 6. Referring to FIGS. 6 and 7 together, the step of performing the third sub-convolution operation (S240) may include performing a fourth sub-convolution operation on l different filters having a width w2 and a result of the second convolution operation, performing a fifth sub-convolution operation on l different filters having a width of w2 and a result of the fourth sub-convolution operation, performing a sixth sub-convolution operation on l different filters having a width of 1 and a result of the second convolution operation, and summing the results of the fifth and sixth sub-convolution operations.

That is, in step S240, it may be understood that the same type of convolution operation as in step S230 is performed once more. However, the number of filters used in step S240 may be different from the number of filters used in step S230. Referring to FIG. 7, it may be seen that 24 k filters may be used in step S230 and 32 k filters may be used in step S240.

Figure 8:
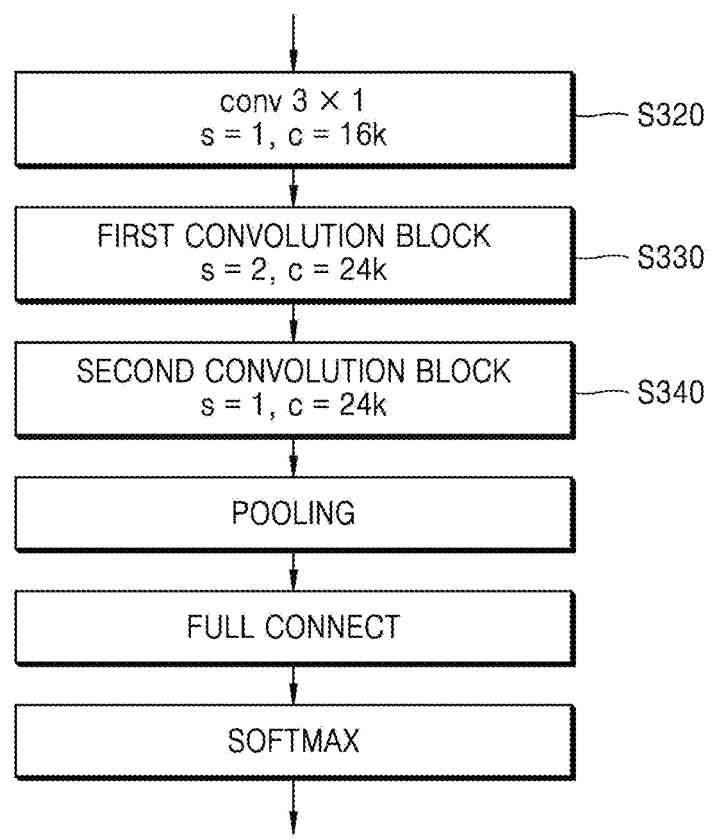
FIG. 8 is a flowchart schematically illustrating a keyword spotting method according to another embodiment of the disclosure.

FIG. 8 is a flowchart schematically illustrating a keyword spotting method according to another embodiment of the disclosure.

Referring to FIG. 8, the keyword spotting method according to another embodiment of the disclosure may include performing a first convolution operation (S320), performing a second convolution operation (S330), and performing a fourth convolution operation (S340). In step S340, a fourth convolution operation may be performed using the second convolution block.

The number of filters used in step S330 and the number of filters used in step S340 may be the same as 24 k, but only the number of filters is the same, and the size of the filter and the value of data included in the filter (e.g., weight activation) may be different.

Figure 9:
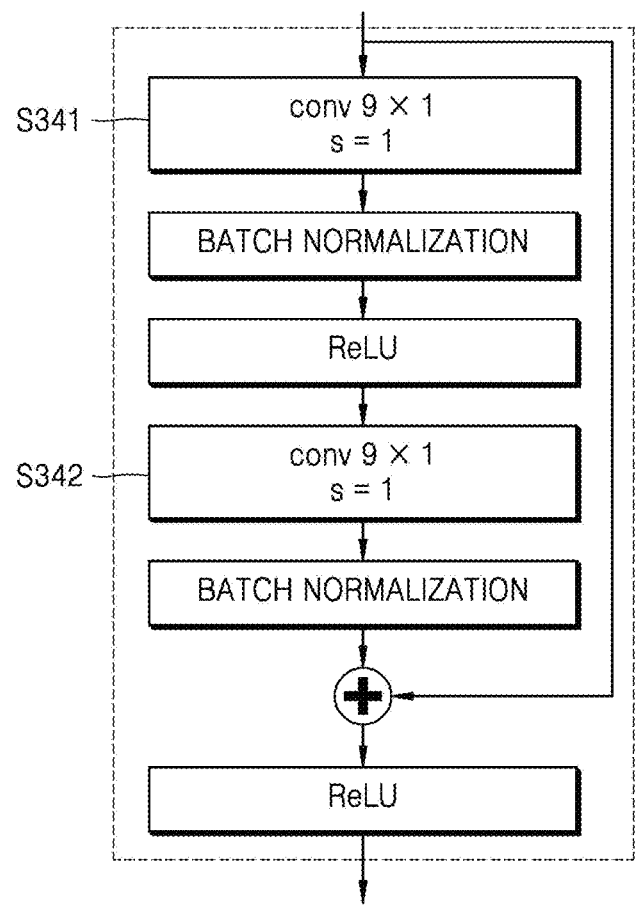
FIG. 9 is a block diagram schematically illustrating a configuration of a second convolution block according to an embodiment of the disclosure.

FIG. 9 is a block diagram schematically illustrating a configuration of a second convolution block according to an embodiment of the disclosure.

The second convolution block may be performed in step S340 of performing a fourth convolution operation. Referring to FIG. 9, step S340 may include performing a seventh sub-convolution operation on m different filters having a width w2 and a result of the second convolution operation (S341), and performing an eighth sub-convolution operation on m different filters having a width w2 and a result of the seventh sub-convolution operation (S342).

In FIG. 9, the width of the filter used in steps S341 and S342 may be set to '9', and the stride value may be set to '1'. In addition, batch normalization may be applied to the result of the seventh sub-convolution operation performed in step S341, and then the ReLU function may be applied as an activation function.

Batch normalization may also be applied to the result of the eighth sub-convolution operation performed in step S342. In addition, a step of summing the result of the second convolution operation performed in step S330 and the result of the eighth sub-convolution operation may be performed.

The result of the second convolution operation performed in step S330 is summed with the result of the eighth sub-convolution operation without an additional convolution operation, and a path corresponding thereto may be defined as Identity Shortcut. Unlike the first convolution block, the Identity Shortcut is applied because the stride values applied to the seventh and eighth sub-convolution operations included in the second convolution block are all 1, so that no dimension change occurs during the convolution operation.

Meanwhile, data to which the ReLU function is applied as an activation function for the summation result may be transferred to a next step, for example, a pooling step.

Figure 10:
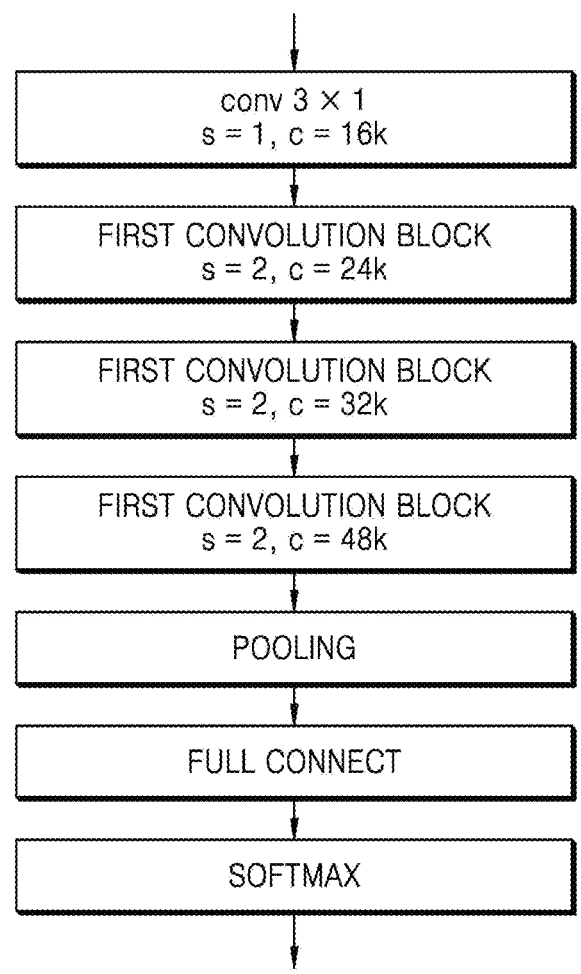
FIG. 10 is a flowchart schematically illustrating a keyword spotting method according to another embodiment of the disclosure.

FIG. 10 is a flowchart schematically illustrating a keyword spotting method according to another embodiment of the disclosure.

Referring to FIG. 10, a keyword spotting method according to another embodiment of the disclosure may include a step of performing a first convolution operation as in step S120 of FIG. 4 and a step of performing a convolution operation using the first convolution block three times in succession.

The configuration of the first convolution block is shown in FIG. 6. In FIG. 10, among the three first convolution blocks, 24 k different filters may be used in the first, and 32 k and 48 k different filters may be used in the second and the last, respectively.

Data to which the ReLU function of the last step is applied in the last first convolution block may be transferred to a next step, for example, a pooling layer.

Figure 11:
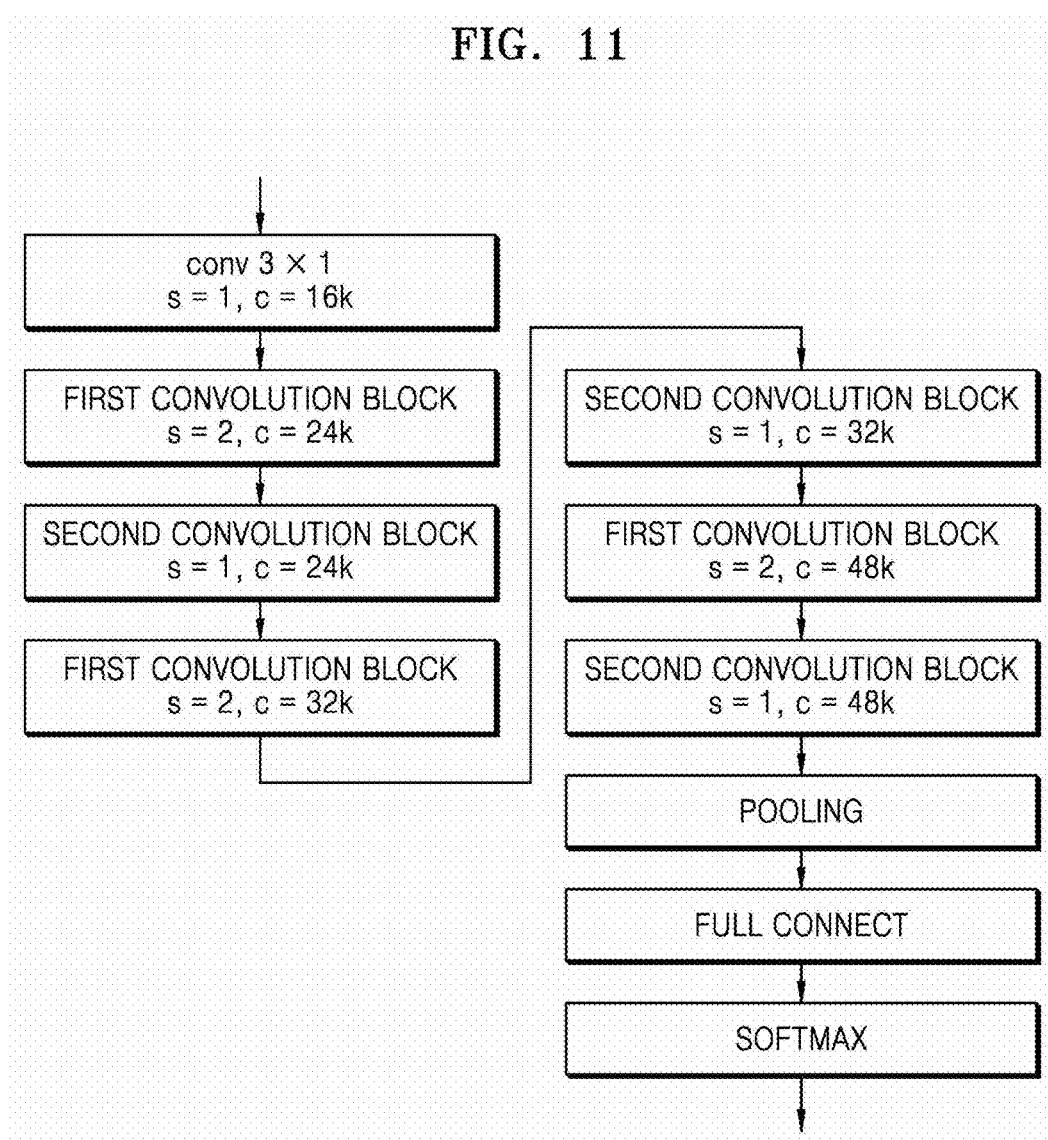
FIG. 11 is a flowchart schematically illustrating a keyword spotting method according to another embodiment of the disclosure.

FIG. 11 is a flowchart schematically illustrating a keyword spotting method according to another embodiment of the disclosure.

Referring to FIG. 11, a keyword spotting method according to another embodiment of the disclosure includes a step of performing a first convolution operation as in step S120 of FIG. 4. The keyword spotting method may include a process in which a convolution operation using a first convolution block is performed and a convolution operation using a second convolution block is repeated three times.

The first convolution block may be configured with reference to FIG. 6 and the second convolution block may be configured with reference to FIG. 9. In FIG. 11, among the three first and second convolution blocks, 24 k different filters may be used in the first first and second convolution blocks, 32 k different filters may be used in the second first and second convolution blocks, and 48 k different filters may be used in the last and second convolution blocks.

Data to which the ReLU function of the last step is applied in the last first convolution block may be transferred to a next step, for example, a pooling layer.

FIG. 12 is a performance comparison table for explaining an effect of a keyword spotting method according to the disclosure.

In the table of FIG. 12, models CNN-1 to Res15 show results of using a voice keyword extraction model according to the conventional method. Among voice keyword extraction models according to the conventional method, the CNN-2 model shows the best results (1.2 ms) in terms of extraction time, and the Res15 model shows the best results (95.8%) in terms of accuracy.

The TC-ResNet8 model to the TC-ResNet14-1.5 model are models to which the keyword spotting method according to the disclosure is applied. First, the TC-ResNet8 model is a model using the method shown in FIGS. 10, and 1 is applied as a k value. Therefore, it may be understood that 16 different filters are used in the step in which the first convolution operation is performed. In addition, it may be understood that 24, 32, and 48 different filters are used in the first, second, and last first convolution blocks, respectively.

The TC-ResNet8-1.5 model is a model using the method shown in FIGS. 10, and 1.5 is applied as a k value. Therefore, it may be understood that 24 different filters are used in the step in which the first convolution operation is performed. In addition, it can be understood that 36, 48, and 72 different filters are used in the first, second, and last first convolution blocks, respectively.

The TC-ResNet14 model is a model using the method shown in FIG. 11, and 1 is applied as a k value. Therefore, it may be understood that 16 different filters are used in the step in which the first convolution operation is performed. In addition, it may be understood that 24, 24, 32, 32, 48, and 48 different filters are sequentially used in the first, second, first, second, first and second convolution blocks, respectively.

The TC-ResNet14-1.5 model is a model using the method shown in FIGS. 11, and 1.5 is applied as a k value. Therefore, it may be understood that 24 different filters are used in the step in which the first convolution operation is performed. In addition, it may be understood that 36, 36, 48, 48, 72, and 72 different filters are sequentially used in the first, second, first, second, first and second convolution blocks, respectively.

Referring to the table shown in FIG. 12, the TC-ResNet8 model has a keyword extraction time of 1.1 ms, which is superior to the fastest keyword extraction time (1.2 ms) when a model according to the conventional method is used. In addition, because the TC-ResNet8 model may secure 96.1% accuracy, it may be understood that it is superior to the conventional method in terms of accuracy.

Meanwhile, the TC-ResNet14-1.5 model recorded an accuracy of 96.6%, which is the most accurate value among the models according to the conventional method and the models according to the disclosure.

Considering the accuracy of voice keyword extraction as the most important measure, the keyword extraction time of the Res15 model, which is the best among the conventional methods, is 424 ms. In addition, the keyword extraction time of the TC-ResNet14-1.5 model corresponding to an embodiment of the disclosure is 5.7 ms. Accordingly, even if the TC-ResNet14-1.5 model, which has the slowest keyword extraction time, is used among the embodiments of the disclosure, voice keywords about 74.8 times faster than the conventional method may be extracted.

On the other hand, in the case of using the TC-ResNet8 model having the fastest keyword extraction time among embodiments of the disclosure, voice keywords may be extracted at a speed 385 times faster than the Res15 model.

Figure 13:
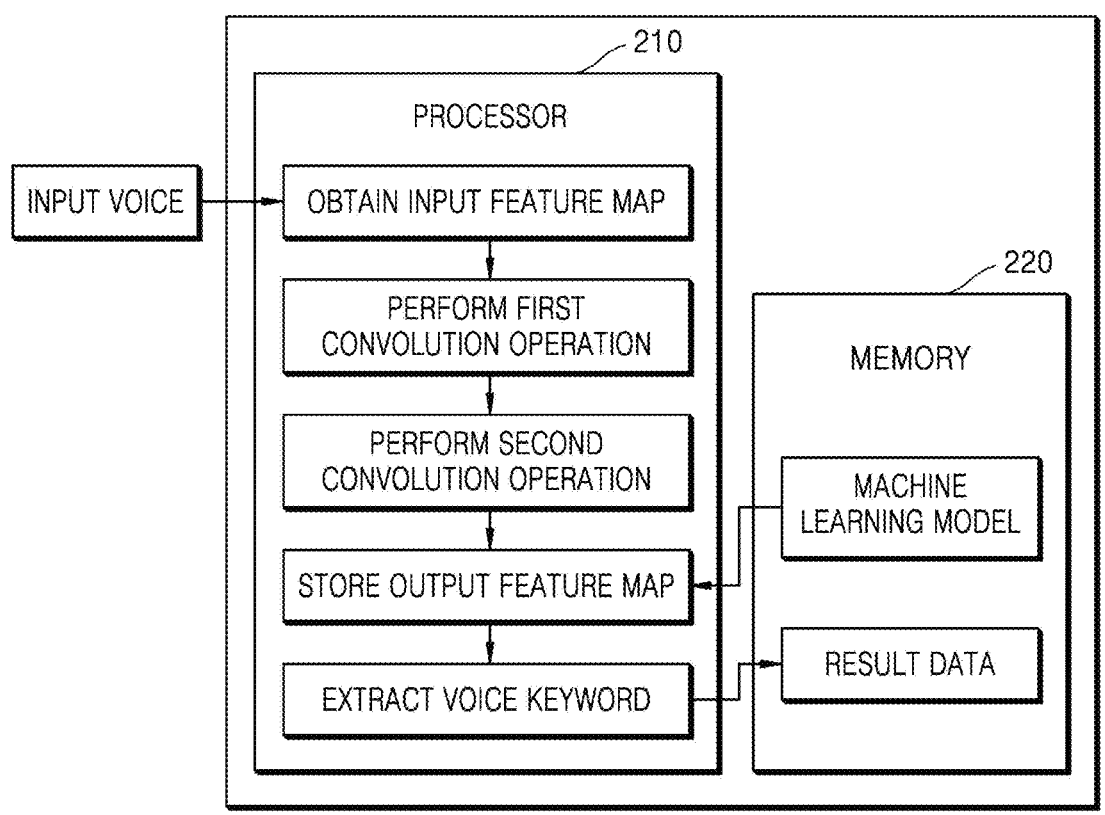
FIG. 13 is a diagram schematically illustrating a configuration of a keyword spotting apparatus according to an embodiment of the disclosure.

FIG. 13 is a diagram schematically illustrating a configuration of a keyword spotting apparatus according to an embodiment of the disclosure.

Referring to FIG. 13, a keyword spotting apparatus 20 may include a processor 210 and a memory 220. Those of ordinary skill in the art related to the present embodiment may see that other general-purpose components may be further included in addition to the components illustrated in FIG. 13. One or more exemplary embodiments, the keyword spotting apparatus 20 may be a terminal, a mobile terminal, an electronic device, a cellular phone, a smart phone, a laptop computer, a tablet PC, an electronic book terminal, a digital broadcasting terminal, a personal digital assistants (PDAs), a portable multimedia players (PMPs), a navigations, a MP3 players, a digital cameras, etc. However, the keyword spotting apparatus 20 is not limited thereto.

The processor 210 controls the all operations of the keyword spotting apparatus 20 and may include at least one processor such as a CPU or the like. The processor 210 may include at least one specialized processor corresponding to each function, or may be an integrated type of processor.

The memory 220 may store programs, data, or files related to a convolution operation performed in a CNN. The memory 220 may store instructions executable by the processor 210. The processor 210 may execute a program stored in the memory 220, read data or a file stored in the memory 220, or store new data. Also, the memory 220 may store program commands, data files, data structures, etc. alone or in combination.

The processor 210 is designed in a hierarchical structure of a high-precision operator (e.g., a 32-bit operator), and may include a plurality of low-precision operators (e.g., an 8-bit operator). In this case, the processor 210 may support an instruction for high-precision operation and a single instruction multiple data (SIMD) instruction for low-precision operation. When the bit-width is quantized to fit the input of a low precision operator, the processor 210 may accelerate a convolution operation by performing a plurality of operations having a small bit width in parallel instead of performing an operation having a large bit width within the same time period. The processor 210 may accelerate the convolution operation in the CNN through a predetermined binary operation.

The processor 210 may obtain an input feature map from the input voice. The input feature map may be obtained with a size of t×1×f (width×height×channel) from a result of MFCC processing for the input voice.

The input feature map may express an input voice acquired for a predetermined time (t) as a frequency with respect to time (t). In addition, each frequency data in the input feature map may be expressed as a floating point.

Further, the processor 210 performs a first convolution operation with the input feature map for each of n different filters having the same channel length as the input feature map. In this case, the width w1 of the n different filters may be set smaller than a width of the input feature map.

Each of the n different filters may discriminate different voices. For example, the first filter may determine a voice corresponding to 'a', and the second filter may determine a voice corresponding to 'o'. Voices corresponding to the characteristics of each filter through the n different filters and convolution operations may further enhance the features of the sound.

A width of the n filters may be defined as w1. When the width of the input feature map is w, the relationship w>w1 may be established. In the first convolution operation, when the number of filters is n and a total of n outputs exist, a result of the convolution operation may be stored in the memory 220.

In the first convolution operation, '1' may be applied as a stride value. The stride refers to the interval at which the filter skips input data in the convolution operation. When '1' is applied as the stride value, the convolution operation is performed on all input data without skipping data.

Further, the processor 210 performs a second convolution operation with a result of the first convolution operation for each of different filters having the same channel length as the input feature map.

The number of filters used for the second convolution operation may be m, and the width of the filter may be defined as w2. In this case, the width of the filter used for the second convolution operation and the width of the filter used for the first convolution operation may be the same as or different from each other.

However, the length in the channel direction of the filter used in the second convolution operation is the same as the length in the channel direction of the input feature map, similar to the length in the channel direction of the filter used in the first convolution operation.

The m different filters used in the second convolution operation may discriminate different voices, similar to n different filters used in the first convolution operation.

In addition, the processor 210 stores the result of the previous convolution operation in the memory 220 as an output feature map, and applies the output feature map to the learned machine learning model to extract a speech keyword.

The output feature map is a result finally obtained before extracting the voice keyword, and may have a form as shown in FIG. 3B. The output feature map stored in the memory 220 may be understood as a result of the convolution operation performed in the preceding step. Accordingly, in an embodiment of the disclosure, the result of the second convolution operation may be stored as the output feature map.

The machine learning model may include a pooling layer, a full-connect layer, a softmax operation, and the like.

Meanwhile, a pooling operation may be performed following the convolution operation described herein, and a zero padding technique may be applied to prevent data reduction that may occur during the pooling operation.

One or more exemplary embodiments, the following example describes the case where the keyword spotting apparatus 20 is a terminal. Based on the keyword spotting method using the artificial neural network according to the disclosure, the terminal may extract a voice keyword from a voice received from a video call session established between the terminal and an external terminal, and perform an action corresponding to the voice keyword.

The operating method of the terminal may include the step of determining, by the first terminal, whether to extract a voice keyword from result data output through the voice keyword extraction model. The operating method of the terminal may include the step of determining whether to generate, by the first terminal, a message inducing to report the user of the second terminal based on the determination result.

For example, if it is determined that the voice keyword has not been extracted from the voice, the video call session between the first terminal and the second terminal may be maintained.

For example, if it is determined that the voice keyword has been extracted from the voice, the terminal may output a message inducing to report the user of the second terminal to the user of the first terminal.

The operating method of the terminal may include the step of receiving, by the first terminal, a request for reporting the user of the second terminal from the user of the first terminal.

When the user of the first terminal requests to report the user of the second terminal, the video call session between the first terminal and the second terminal may be stopped.

The operating method of the terminal may include the steps of analyzing the result data output through the voice keyword extraction model, classifying a voice corresponding to the data having the highest probability value among the result data as the voice keyword, and updating the voice keyword extraction model by using the voice classified as the voice keyword, wherein the voice classified as a voice keyword may be a voice that has not been extracted as a voice keyword in the step of determining whether to extract the voice keyword.

Figure 14:
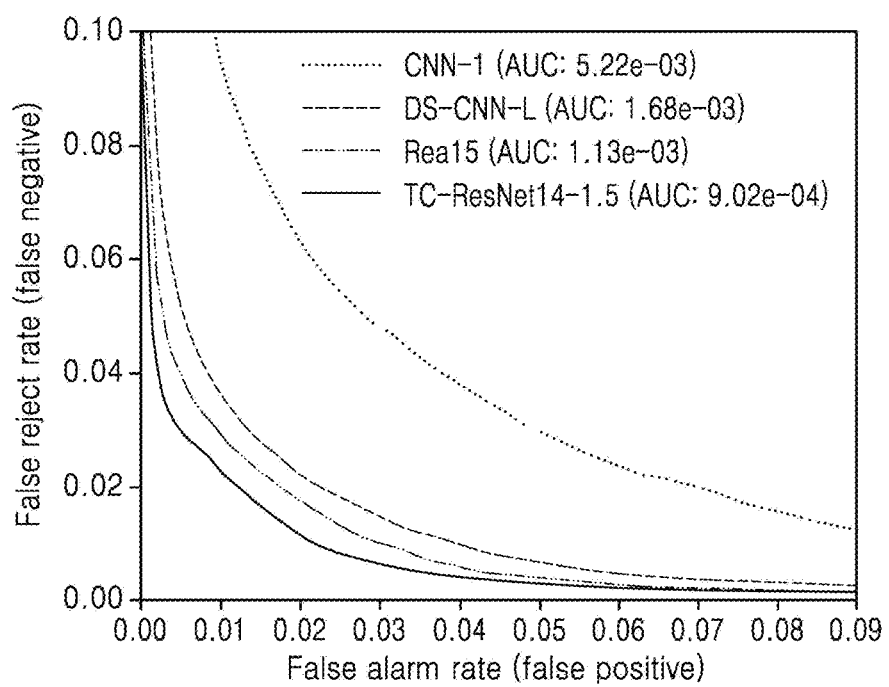
FIG. 14 is a graph for illustrating an effect of a keyword spotting method according to another embodiment of the disclosure.

FIG. 14 is a graph for illustrating an effect of a keyword spotting method according to another embodiment of the disclosure.

The keyword spotting method according to an embodiment of the disclosure plots the ROC curves of models which depict the best accuracy among their variants: CNN-1, DS-CNN-L, Res15, and TC-ResNet14-1.5. As presented in FIG. 14, TC-ResNet14-1.5 is less likely to miss target keywords compared to other baselines assuming that the number of incorrectly detected key-words is the same. The small area under the curve (AUC) means that the model would miss fewer target keywords on average for various false alarm rates. TC-ResNet14-1.5 shows the smallest AUC, which is critical for good user experience with KWS system.

FIG. 15 is a performance comparison table for illustrating an effect of a keyword spotting method according to another embodiment of the disclosure.

The keyword spotting method according to an embodiment of the disclosure designed 2D-ResNet8, whose architecture is identical to TC-ResNet8 except for the use of 3×3 2D convolutions. 2D-ResNet8 (in FIG. 15) shows comparable accuracy, but is 9.2×slower compared to TC-ResNet8 (in FIG. 12). TC-ResNet8-1.5 is able to surpass 2D-ResNet8 while using less computational resources.

The following is a description of the keyword spotting method according to the disclosure or the operation performed by the apparatus for extracting a voice keyword using an artificial neural network according to the disclosure.

Keyword spotting (KWS) plays a critical role in enabling speech-based user interactions on smart devices. Recent developments in the field of deep learning have led to wide adoption of convolutional neural networks (CNNs) in KWS systems due to their exceptional accuracy and robustness. The main challenge faced by KWS systems is the trade-off between high accuracy and low latency. Unfortunately, there has been little quantitative analysis of the actual latency of KWS models on mobile devices. This is especially concerning since conventional convolution-based KWS approaches are known to require a large number of operations to attain an adequate level of performance.

In this paper, we propose a temporal convolution for real-time KWS on mobile devices. Unlike most of the 2D convolution-based KWS approaches that require a deep architecture to fully capture both low- and high-frequency domains, we exploit temporal convolutions with a compact ResNet architecture. In Google Speech Command Dataset, we achieve more than 385×speedup on Google Pixel 1 and surpass the accuracy compared to the state-of-the-art model. In addition, we release the implementation of the proposed and the baseline models including an end-to-end pipeline for training models and evaluating them on mobile devices.

Index Terms: keyword spotting, real-time, convolutional neural network, temporal convolution, mobile device

1. INTRODUCTION

Keyword spotting (KWS) aims to detect pre-defined keywords in a stream of audio signals. It is widely used for hands-free control of mobile applications. Since its use is commonly concentrated on recognizing wake-up words (e.g., "Hey Siri" [1], "Alexa" [2, 3], and "Okay Google" [4]) or distinguishing common commands (e.g., "yes" or "no") on mobile devices, the response of KWS should be both immediate and accurate. However, it is challenging to implement fast and accurate KWS models that meet the real-time constraint on mobile devices with restricted hardware resources.

Recently, with the success of deep learning in a variety of cognitive tasks, neural network based approaches have become popular for KWS [5, 6, 7, 8, 9, 10]. Especially, KWS studies based on convolutional neural networks (CNNs) show remarkable accuracy [6, 7, 8]. Most of CNN-based KWS approaches receive features, such as mel-frequency cepstral coefficients (MFCC), as a 2D input of a convolutional network. Even though such CNN-based KWS approaches offer reliable accuracy, they demand considerable computations to meet a performance requirement. In addition, inference time on mobile devices has not been analyzed quantitatively, but instead, indirect metrics have been used as a proxy to the latency. Zhang et al. [7] presented the total number of multiplications and additions performed by the whole network. Tang and Lin [8] reported the number of multiplications of their network as a surrogate for inference speed. Unfortunately, it has been pointed out that the number of operations such as additions and multiplications, is only an indirect alternative for the direct metric such as latency [11, 12, 13]. Neglecting the memory access costs and different platforms being equipped with varying degrees of optimized operations are potential sources for the discrepancy. Thus, we focus on the measurement of actual latency on mobile devices.

In this paper, we propose a temporal convolutional neural network for real-time KWS on mobile devices, denoted as TC-ResNet. We apply temporal convolution, i.e., 1D convolution along the temporal dimension, and treat MFCC as input channels. The proposed model utilizes advantages of temporal convolution to enhance the accuracy and reduce the latency of mobile models for KWS. Our contributions are as follows:

- We propose TC-ResNet which is a fast and accurate convolutional neural network for real-time KWS on mobile devices. According to our experiments on Google Pixel 1, the proposed model shows 385× speedup and a 0.3% p increase in accuracy compared to the state-of-the-art CNN-based KWS model on Google Speech Commands Dataset [14].
- We release our models for KWS and implementations of the state-of-the-art CNN-based KWS models [6, 7, 8] together with the complete benchmark tool to evaluate the models on mobile devices.
- We empirically demonstrate that temporal convolution is indeed responsible for reduced computation and increased performance in terms of accuracy compared to 2D convolutions in KWS on mobile devices.

2. NETWORK ARCHITECTURE

2.1. Temporal Convolution for KWS

FIG. 2A to 2B, and FIG. 3A to 3B are a simplified example illustrating the difference between 2D convolution and temporal convolution for KWS approaches utilizing MFCC as input data. Assuming that stride is one and zero padding is applied to match the input and the output resolution, given input $X \in \mathbb{R}^{w \times h \times c}$ and weight $W \in \mathbb{R}^{k_w \times k_h \times c \times c'}$, 2D convolution outputs $Y \in \mathbb{R}^{w \times h \times c'}$. MFCC is widely used for transforming raw audio into a time-frequency representation, $I \in \mathbb{R}^{t \times f}$ where t represents the time axis (x-axis in FIG. 2A) and f denotes the feature axis extracted from frequency domain (y-axis in FIG. 2A). Most of the previous studies [7, 8] use input tensor $X \in \mathbb{R}^{w \times h \times c}$ where w=t, h=f (or vice versa), and c=1 ($X_{2d} \in \mathbb{R}^{t \times f \times 1}$ in FIG. 2B and FIG. 2C).

CNNs are known to perform a successive transformation of low-level features into higher level concepts. However, since modern CNNs commonly utilize small kernels, it is difficult to capture informative features from both low and high frequencies with a relatively shallow network (colored box in FIG. 2B and FIG. 2C only cover a limited range of frequencies). Assuming that one naively stacks n convolutional layers of 3×3 weights with a stride of one, the receptive field of the network only grows up to 2n+1. We can mitigate this problem by increasing the stride or adopting pooling, attention, and recurrent units. However, many models still require a large number of operations, even if we apply these methods, and has a hard time running real-time on mobile devices.

In order to implement a fast and accurate model for real-time KWS, we reshape the input from $X_{2d}$ in FIG. 2B and FIG. 2C to $X_{1d}$ in FIG. 3A and FIG. 3B. Our main idea is to treat per-frame MFCC as a time series data, rather than an intensity or grayscale image, which is a more natural way to interpret audio. We consider I as one-dimensional sequential data whose features at each time frame are denoted as f. In other words, rather than transforming I to $X_{2d} \in \mathbb{R}^{t \times f \times 1}$ we set h=1 and c=f, which results in $X_{1d} \in \mathbb{R}^{t \times 1 \times f}$, and feed it as an input to temporal convolution (FIG. 3A and FIG. 3B). The advantages of the proposed method are as follows:

Large receptive field of audio features. In the proposed method, all lower-level features always participate in forming the higher-level features in the next layer. Thus, it takes advantage of informative features in lower layers (colored box in FIG. 3A and FIG. 3B cover a whole range of frequencies), thereby avoiding stacking many layers to form higher-level features. This enables us to achieve better performance even with a small number of layers.

Small footprint and low computational complexity. Applying the proposed method, a two-dimensional feature map shrinks in size if we keep the number of parameters the same as illustrated in FIG. 2B-2C and FIG. 3A-3B. Assuming that both conventional 2D convolution, $W_{2d} \in \mathbb{R}^{3 \times 3 \times 1 \times c}$ and proposed temporal convolution, $W_{1d} \in \mathbb{R}^{3 \times 1 \times f \times c'}$ have the same number of parameters (i.e., $$c' = \frac{3 \times c}{f}),$$

the proposed temporal convolution requires a smaller number of computations compared to the 2D convolution. In addition, the output feature map (i.e., the input feature map of the next layer) of the temporal convolution, $Y_{1d} \in \mathbb{R}^{t \times 1 \times c'}$ is smaller than that of a 2D convolution, $Y_{2d} \in \mathbb{R}^{t \times f \times c}$. The decrease in feature map size leads to a dramatic reduction of the computational burden and footprint in the following layers, which is key to implementing fast KWS.

2.2. TC-ResNet Architecture

We adopt ResNet [15], one of the most widely used CNN architectures, but utilize m×1 kernels (m=3 for the first layer and m=9 for the other layers) rather than 3×3 kernels (FIG. 6, 9, 10, 11). None of the convolution layers and fully connected layers have biases, and each batch normalization layer [16] has trainable parameters for scaling and shifting. The identity shortcuts can be directly used when the input and the output have matching dimensions (FIG. 9), otherwise, we use an extra conv-BN-ReLU to match the dimensions (FIG. 6). Tang and Lin [8] also adopted the residual network, but they did not employ a temporal convolution and used a conventional 3×3 kernel. In addition, they replaced strided convolutions with dilated convolutions of stride one. Instead, we employ temporal convolutions to increase the effective receptive field and follow the original ResNet implementation for other layers by adopting strided convolutions and excluding dilated convolutions.

We select TC-ResNet8 (FIG. 10), which has three residual blocks and {16, 24, 32, 48} channels for each layer including the first convolution layer, as our base model. TC-ResNet14 (FIG. 11) expands the network by incorporating twice as much residual blocks compared to TC-ResNet8.

We introduce width multiplier [17] (k in FIG. 10 and FIG. 11) to increase (or decrease) the number of channels at each layer, thereby achieving flexibility in selecting the right capacity model for given constraints. For example, in TC-ResNet8, a width multiplier of 1.5 expands the model to have {24, 36, 48, 72} number of channels respectively. We denote such a model by appending a multiplier suffix such as TC-ResNet8-1.5. TC-ResNet14-1.5 is created in the same manner.

3. EXPERIMENTAL FRAMEWORK

3.1 Experimental Setup

Dataset.

We evaluated the proposed models and baselines [6, 8, 7] using Google Speech Commands Dataset [14]. The dataset contains 64,727 one-second-long utterance files which are recorded and labeled with one of 30 target categories. Following Google's implementation [14], we distinguish 12 classes: "yes", "no", "up", "down", "left", "right", "on", "off", "stop", "go", silence, and unknown. Using SHA-1 hashed name of the audio files, we split the dataset into training, validation, and test sets, with 80% training, 10% validation, and 10% test, respectively.

Data Augmentation and Preprocessing.

We followed Google's preprocessing procedures which apply random shift and noise injection to training data. First, in order to generate background noise, we randomly sample and crop background noises provided in the dataset, and multiply it with a random coefficient sampled from uniform distribution, $U(0, 0.1)$. The audio file is decoded to a float tensor and shifted by s seconds with zero padding, where s is sampled from $U(-0.1, 0.1)$. Then, it is blended with the background noise. The raw audio is decomposed into a sequence of frames following the settings of the previous study [8] where the window length is 30 ms and the stride is 10 ms for feature extraction. We use 40 MFCC features for each frame and stack them over time-axis.

Training.

We trained and evaluated the models using TensorFlow [18]. We use a weight decay of 0.001 and dropout with a probability of 0.5 to alleviate overfitting. Stochastic gradient descent is used with a momentum of 0.9 on a mini-batch of 100 samples. Models are trained from scratch for 30 k iterations. Learning rate starts at 0.1 and is divided by 10 at every 10 k iterations. We employ early stopping [19] with the validation split.

Evaluation.

We use accuracy as the main metric to evaluate how well the model performs. We trained each model 15 times and report its average performance. Receiver operating characteristic (ROC) curves, of which the x-axis is the false alarm rate and the y-axis is the false reject rate, are plotted to compare different models. To extend the ROC curve to multiclasses, we perform micro-averaging over multiple classes per experiment, then vertically average them over the experiments for the final plot.

We report the number of operations and parameters which faithfully reflect the real-world environment for mobile deployment. Unlike previous works which only reported the numbers for part of the computation such as the number of multiply operations [8] or the number of multiplications and additions only in the matrix-multiplication operations [7], we include FLOPs [20], computed by TensorFlow profiling tool [21], and the number of all parameters instead of only trainable parameters reported by previous studies [8].

Inference speed can be estimated by FLOPs but it is well known that FLOPs are not always proportional to speed. Therefore, we also measure inference time on a mobile device using the TensorFlow Lite Android benchmark tool [22]. We measured inference time on a Google Pixel 1 and forced the model to be executed on a single little core in order to emulate the always-on nature of KWS. The benchmark program measures the inference time 50 times for each model and reports the average. Note that the inference time is measured from the first layer of models that receives MFCC as input to focus on the performance of the model itself.

3.2. Baseline Implementations

We carefully selected baselines and verified advantages of the proposed models in terms of accuracy, the number of parameters, FLOPs, and inference time on mobile devices. Below are the baseline models:

CNN-1 and CNN-2 [6]. We followed the implementations of [7] where window size is 40 ms and the stride is 20 ms using 40 MFCC features. CNN-1 and CNN-2 represent cnn-trad-fpool3 and cnn-one-fstride4 in [6], respectively.

DS-CNN-S, DS-CNN-M, and DS-CNN-L [7]. DS-CNN utilizes depthwise convolutions. It aims to achieve the best accuracy when memory and computation resources are constrained. We followed the implementation of [7] which utilizes 40 ms window size with 20 ms stride and only uses 10 MFCCs to reduce the number of operations. DS-CNN-S, DS-CNN-M, and DS-CNN-L represent small-, medium-, and large-size model, respectively.

Res8, Res8-Narrow, Res15, and Res15-Narrow [8]. Res-variants employ a residual architecture for keyword spotting. The number following Res (e.g., 8 and 15) denotes the number of layers and the Narrow suffix represents that the number of channels is reduced. Res15 has shown the best accuracy with Google Speech Commands Dataset among the KWS studies which are based on CNNs. The window size is 30 ms, the stride is 10 ms, and MFCC feature size is 40.

We release our end-to-end pipeline codebase for training, evaluating, and benchmarking the baseline models and together with the proposed models. It consists of TensorFlow implementation of models, scripts to convert the models into the TensorFlow Lite models that can run on mobile devices, and the pre-built TensorFlow Lite Android benchmark tool.

4. EXPERIMENTAL RESULTS

4.1. Google Speech Command Dataset

FIG. 12 shows the experimental results. Utilizing advantages of temporal convolutions, we improve the inference time measured on mobile device dramatically while achieving better accuracy compared to the baseline KWS models. TC-ResNet8 achieves 29× speedup while improving 5.4% p in accuracy compared to CNN-1, and improves 11.5% p in accuracy while maintaining a comparable latency to CNN-2. Since DS-CNN is designed for the resource-constrained environment, it shows better accuracy compared to the naive CNN models without using large number of computations. However, TC-ResNet8 achieves 1.5×/4.7×/15.3× speedup, and improves 1.7% p/1.2% p/0.7% p accuracy compared to DS-CNN-S/DS-CNN-M/DS-CNN-L, respectively. In addition, the proposed models show better accuracy and speed compared to Res which shows the best accuracy among baselines. TC-ResNet8 achieves 385× speedup while improving 0.3% p accuracy compared to deep and complex Res baseline, Res15. Compared to a slimmer Res baseline, Res8-Narrow, proposed TC-ResNet8 achieves 43× speedup while improving 6% p accuracy. Note that our wider and deeper models (e.g., TC-ResNet8-1.5, TC-ResNet14, and TC-ResNet14-1.5) achieve better accuracy at the expense of inference speed.

We also plot the ROC curves of models which depict the best accuracy among their variants: CNN-1, DS-CNN-L, Res15, and TC-ResNet14-1.5. As presented in FIG. 14, TC-ResNet14-1.5 is less likely to miss target keywords compared to other baselines assuming that the number of incorrectly detected key-words is the same. The small area under the curve (AUC) means that the model would miss fewer target keywords on average for various false alarm rates. TC-ResNet14-1.5 shows the smallest AUC, which is critical for good user experience with KWS system.

4.2. Impact of Temporal Convolution

We demonstrate that the proposed method could effectively improve both accuracy and inference speed compared to the base-line models which treat the feature map as a 2D image. We further explore the impact of the temporal convolution by comparing variants of TC-ResNet8, named 2D-ResNet8 and 2D-ResNet8-Pool, which adopt a similar network architecture and the number of parameters but utilize 2D convolutions.

We designed 2D-ResNet8, whose architecture is identical to TC-ResNet8 except for the use of 3×3 2D convolutions. 2D-ResNet8 (in FIG. 15) shows comparable accuracy, but is 9.2× slower compared to TC-ResNet8 (in FIG. 12). TC-ResNet8-1.5 is able to surpass 2D-ResNet8 while using less computational resources.

We also demonstrate the use of temporal convolution is superior to other methods of reducing the number of operations in CNNs such as applying a pooling layer. In order to reduce the number of operations while minimizing the accuracy loss, CNN-1, Res8, and Res8-Narrow adopt average pooling at an early stage, specifically, right after the first convolution layer.

We inserted an average pooling layer, where both the window size and the stride are set to 4, after the first convolution layer of 2D-ResNet8, and named it 2D-ResNet8-Pool. 2D-ResNet8-Pool improves inference time with the same number of parameters, however, it loses 1.2% p accuracy and is still 3.2× slower compared to TC-ResNet8.

5. RELATED WORKS

Recently, there has been a wide adoption of CNNs in KWS. Sainath et al. [6] proposed small-footprint CNN models for KWS. Zhang et al. [7] searched and evaluated proper neural network architectures within memory and computation constraints. Tang and Lin [8] exploited residual architecture and dilated convolutions to achieve further improvement in accuracy while preserving compact models. In previous studies [6, 7, 8], it has been common to use 2D convolutions for inputs with time-frequency representations. However, there has been an increase in the use of 1D convolutions in acoustics and speech domain [23, 24]. Unlike previous studies [23, 24] our work applies 1 D convolution along the temporal axis of time-frequency representations instead of convolving along the frequency axis or processing raw audio signals.

6. CONCLUSION

In this investigation, we aimed to implement fast and accurate models for real-time KWS on mobile devices. We measured inference speed on the mobile device, Google Pixel 1, and provided quantitative analysis of conventional convolution-based KWS models and our models utilizing temporal convolutions. Our proposed model achieved 385× speedup while improving 0.3% p accuracy compared to the state-of-the-art model. Through ablation study, we demonstrated that temporal convolution is indeed responsible for the dramatic speedup while improving the accuracy of the model. Further studies analyzing the efficacy of temporal convolutions for a diverse set of network architectures would be worthwhile.

The embodiments described above may also be implemented in the form of a recording medium including instructions executable by a computer such as a program module executed by a computer. Computer-readable medium may be any available medium that may be accessed by a computer, and may include both volatile and non-volatile medium, removable and non-removable medium.

Further, the computer-readable medium may include a computer storage medium. Computer storage medium may include volatile, nonvolatile, removable and non-removable medium implemented in any method or technology for storage of information such as computer-readable instructions, data structures, program modules or other data.

The disclosure may provide a keyword spotting apparatus, a method, and a computer-readable recording medium capable of rapidly extracting voice keywords with high accuracy.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

7. REFERENCES

[1] S. Sigtia, R. Haynes, H. Richards, E. Marchi, and J. Bridle, "Efficient voice trigger detection for low resource hardware," in Pro-ceedings of the Annual Conference of the International Speech Communication Association (INTERSPEECH), 2018.

[2] M. Sun, D. Snyder, Y. Gao, V. Nagaraja, M. Rodehorst, S. Pan-chapagesan, N. Strom, S. Matsoukas, and S. Vitaladevuni, "Compressed time delay neural network for small-footprint keyword spotting," in Proceedings of the Annual Conference of the International Speech Communication Association (INTERSPEECH), 2017.

[3] G. Tucker, M. Wu, M. Sun, S. Panchapagesan, G. Fu, and S. Vitaladevuni, "Model compression applied to small-footprint keyword spotting," in Proceedings of the Annual Conference of the International Speech Communication Association (INTERSPEECH), 2016.

[4] G. Chen, C. Parada, and G. Heigold, "Small-footprint keyword spotting using deep neural networks," in Proceedings of the IEEE International Conference on Acoustics, Speech and Signal Processing (ICASSP), 2014.

[5] Z. Wang, X. Li, and J. Zhou, "Small-footprint keyword spotting using deep neural network and connectionist temporal classifier," arXiv preprint arXiv:1709.03665, 2017.

[6] T. N. Sainath and C. Parada, "Convolutional neural networks for small-footprint keyword spotting," in Proceedings of the Annual Conference of the International Speech Communication Association (INTERSPEECH), 2015.

[7] Y. Zhang, N. Suda, L. Lai, and V. Chandra, "Hello edge: Keyword spotting on microcontrollers," arXiv preprint arXiv:1711.07128, 2017.

[8] R. Tang and J. Lin, "Deep residual learning for small-footprint keyword spotting," in Proceedings of the IEEE International Conference on Acoustics, Speech and Signal Processing (ICASSP), 2018.

[9] D. C. de Andrade, S. Leo, M. L. D. S. Viana, and C. Bernkopf, "A neural attention model for speech command recognition," arXiv preprint arXiv:1808.08929, 2018.

[10] S. O. Arik, M. Kliegl, R. Child, J. Hestness, A. Gibiansky, C. Fougner, R. Prenger, and A. Coates, "Convolutional recurrent neural networks for small-footprint keyword spotting," in Proceedings of the Annual Conference of the International Speech Communication Association (INTERSPEECH), 2017.

[11] M. Sandler, A. Howard, M. Zhu, A. Zhmoginov, and L.-C. Chen, "MobileNetV2: Inverted residuals and linear bottlenecks," in Proceedings of the IEEE/CVF Conference on Computer Vision and Pattern Recognition (CVPR), 2018.

[12] M. Tan, B. Chen, R. Pang, V. Vasudevan, and Q. V. Le, "Mnas-Net: Platform-aware neural architecture search for mobile," arXiv preprint arXiv:1807.11626, 2018.

[13] N. Ma, X. Zhang, H.-T. Zheng, and J. Sun, "ShuffleNet v2: Prac-tical guidelines for efficient cnn architecture design," in Proceed-ings of the European Conference on Computer Vision (ECCV), 2018.

[14] P. Warden. (2017, August) Launching the speech commands dataset. [Online]. Available: https://ai.googleblog.com/2017/08/launching-speech-commands-dataset.html

[15] K. He, X. Zhang, S. Ren, and J. Sun, "Deep residual learning for image recognition," in Proceedings of the IEEE/CVF Conference on Computer Vision and Pattern Recognition (CVPR), 2016.

[16] S. Ioffe and C. Szegedy, "Batch normalization: Accelerating deep network training by reducing internal covariate shift," in Proceedings of the Internal Conference on Machine Learning (ICML), 2015.

[17] A. G. Howard, M. Zhu, B. Chen, D. Kalenichenko, W. Wang, T. Weyand, M. Andreetto, and H. Adam, "MobileNets: Efficient convolutional neural networks for mobile vision applications," arXiv preprint arXiv:1704.04861, 2017.

[18] M. Abadi, P. Barham, J. Chen, Z. Chen, A. Davis, J. Dean, M. Devin, S. Ghemawat, G. Irving, M. Isard et al., "TensorFlow: A system for large-scale machine learning." in Proceedings of the USENIX Symposium on Operating Systems Design and Implementation (OSDI), 2016.

[19] L. Prechelt, "Early stopping-but when?" in Neural Networks: Tricks of the trade. Springer, 1998, pp. 55-69.

[20] S. Arik, H. Jun, and G. Diamos, "Fast spectrogram inversion using multi-head convolutional neural networks," arXiv preprint arXiv:1808.06719, 2018.

[21] TensorFlow Profiler and Advisor. [Online]. Avail-able: https://github.com/tensorflow/tensorflow/blob/master/tensorflow/core/profiler/README.md

[22] TFLite Model Benchmark Tool. [Online]. Available: https://github.com/tensorflow/tensorflow/tree/r1.13/tensorflow/lite/tools/benchmark/

[23] H. Lim, J. Park, K. Lee, and Y. Han, "Rare sound event detection using 1d convolutional recurrent neural networks," in Proceedings of the Detection and Classification of Acoustic Scenes and Events 2017 Workshop, 2017.

[24] K. Choi, G. Fazekas, M. Sandler, and K. Cho, "Convolutional recurrent neural networks for music classification," in Proceedings of the IEEE International Conference on Acoustics, Speech and Signal Processing (ICASSP), 2017.

What is claimed is:

1. A method of operation of an apparatus for keyword spotting, the method comprising:
    obtaining, from an input voice, an input feature map;
    wherein lengths in a channel direction of the input feature map are independently determined for a plurality of sections;
    wherein the plurality of sections is obtained by dividing the input voice by a predetermined period; and
    wherein each length is defined based on frequency data extracted from a corresponding section of the input voice and corresponds to frequency value for the corresponding section;
    performing a convolution operation between the input feature map and at least one filter;
    wherein performing the convolution operation comprises performing a first convolution operation between the input feature map and each of n different filters;
    wherein the n different filters cover a frequency range of the input feature map and each have a channel length that is the same as the channel length for the input feature map; and
    wherein the channel length is above zero;
    storing a result of the convolution operation as an output feature map; and
    extracting a keyword from the input voice based on the output feature map,
    wherein each filter of the n different filters used in the first convolution operation is configured to distinguish characteristics of different voices corresponding to letter sounds.

2. The method of claim 1, wherein the input feature map represents data corresponding to a size of t×1×f (width×height×channel) and the at least one filter represents data corresponding to a size of t'×1×f (width×height×channel), where t and t' represent the number of activations listed in an axial direction corresponding to time, and f represents the number of activations listed in an axial direction corresponding to frequency.

3. The method of claim 1, further comprising performing a second convolution operation by using a first convolution block that performs a plurality of sub-convolution operations in which one or more stride values are respectively applied to a result of the first convolution operation.

4. The method of claim 1, further comprising performing a second convolution based on a plurality of first convolution blocks to which at least one of a number of strides and a number of filters is applied differently.

5. The method of claim 3, wherein performing the second convolution operation comprises performing a second convolution by using a second convolution block that performs a plurality of preset sub-convolution operations based on a result of an operation of the first convolution block and a stride value.

6. The method of claim 1,
    wherein obtaining the input feature map includes obtaining an input feature map having a size of t×1×f (width×height×channel) from a result of mel frequency cepstral coefficient (MFCC) processing for the input voice, and
    wherein t denotes time and f denotes frequency.

7. An apparatus for extracting a voice keyword using an artificial neural network, the apparatus comprising:
    a memory in which at least one program is stored; and
    a processor for extracting a voice keyword using the artificial neural network by executing the at least one program, wherein the processor is configured to:

obtain, from an input voice, an input feature map;
wherein lengths in a channel direction of the input feature map are independently determined for a plurality of sections;
wherein the plurality of sections is obtained by dividing the input voice by a predetermined period; and
wherein each length is defined based on frequency data extracted from a corresponding section of the input voice and corresponds to frequency value for the corresponding section;
perform a convolution operation between the input feature map and at least one filter;
wherein performing the convolution operation comprises performing a first convolution operation between the input feature map and each of n different filters;
wherein the n different filters cover a frequency range of the input feature map and each have a channel length that is the same as the channel length for the input feature map; and
wherein the channel length is above zero;
store a result of the convolution operation as an output feature map, and
extract a keyword from the input voice based on the output feature map,
wherein each filter of the n different filters used in the first convolution operation is configured to distinguish characteristics of different voices corresponding to letter sounds.

8. The apparatus of claim 7, wherein the input feature map represents data corresponding to a size of t×1×f (width×height×channel) and the at least one filter represents data corresponding to a size of t'×1×f (width×height×channel), where t and t' represent the number of activations listed in an axial direction corresponding to time, and f represents the number of activations listed in an axial direction corresponding to frequency.

9. The apparatus of claim 7, wherein the processor is further configured to perform a second convolution operation by using a first convolution block that performs a plurality of sub-convolution operations in which one or more stride values are respectively applied to a result of the first convolution operation.

10. The apparatus of claim 7, wherein the processor is further configured to perform a second convolution based on a plurality of first convolution blocks to which at least one of a number of strides and a number of filters is applied differently.

11. The apparatus of claim 9, wherein the processor is further configured to perform a second convolution by using a second convolution block that performs a plurality of preset sub-convolution operations based on a result of an operation of the first convolution block and a stride value.

12. The apparatus of claim 7,
wherein the processor is configured to obtain an input feature map having a size of t×1×f (width×height×channel) from a result of mel frequency cepstral coefficient (MFCC) processing for the input voice, and
wherein t denotes time and f denotes frequency.

13. A non-transitory computer-readable recording medium for keyword spotting, wherein the program instructions are executable by one or more processors to perform a process that comprises:
obtaining, from an input voice, an input feature map;
wherein lengths in a channel direction of the input feature map are independently determined for a plurality of sections;
wherein the plurality of sections is obtained by dividing the input voice by a predetermined period; and
wherein each length is defined based on frequency data extracted from a corresponding section of the input voice and corresponds to frequency value for the corresponding section;
performing a convolution operation between the input feature map and at least one filter;
wherein performing the convolution operation comprises performing a first convolution operation between the input feature map and each of n different filters; and
wherein the n different filters cover a frequency range of the input feature map and each have a channel length that is the same as the channel length for the input feature map; and
wherein the channel length is above zero;
storing a result of the convolution operation as an output feature map; and
extracting a keyword from the input voice based on the output feature map,
wherein each filter of the n different filters used in the first convolution operation is configured to distinguish characteristics of different voices corresponding to letter sounds.

14. The non-transitory computer-readable recording medium of claim 13, wherein the input feature map represents data corresponding to a size of t×1×f (width×height×channel) and the at least one filter represents data corresponding to a size of t'×1×f (width×height×channel), where t and t' represent the number of activations listed in an axial direction corresponding to time, and f represents the number of activations listed in an axial direction corresponding to frequency.

15. The non-transitory computer-readable recording medium of claim 13, further comprising performing a second convolution operation by using a first convolution block that performs a plurality of sub-convolution operations in which one or more stride values are respectively applied to a result of the first convolution operation.

16. The non-transitory computer-readable recording medium of claim 13, further comprising performing a second convolution based on a plurality of first convolution blocks to which at least one of a number of strides and a number of filters is applied differently.

17. The non-transitory computer-readable recording medium of claim 15, wherein performing the second convolution operation comprises performing a second convolution by using a second convolution block that performs a plurality of preset sub-convolution operations based on a result of an operation of the first convolution block and a stride value.

* * * * *